US011216695B2

(12) United States Patent
Oishi

(10) Patent No.: US 11,216,695 B2
(45) Date of Patent: Jan. 4, 2022

(54) IMAGE PROCESSING SYSTEM AND IMAGE PROCESSING METHOD

(71) Applicant: CANON KABUSHIKI KAISHA, Tokyo (JP)

(72) Inventor: Go Oishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 16/723,117

(22) Filed: Dec. 20, 2019

(65) Prior Publication Data
US 2020/0202173 A1  Jun. 25, 2020

(30) Foreign Application Priority Data
Dec. 25, 2018 (JP) .............................. JP2018-241723

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00442* (2013.01); *G06K 9/72* (2013.01);
(Continued)

(58) Field of Classification Search
CPC .... G06K 9/6256; G06K 9/00442; G06K 9/72; G06K 2209/011; G06K 9/325;
(Continued)

(56) References Cited

U.S. PATENT DOCUMENTS 5,048,097 A    9/1991 Gaborski
8,331,739 B1 * 12/2012 Abdulkader ........... G06K 9/033
382/311
(Continued)

FOREIGN PATENT DOCUMENTS

CN    101770569 A    7/2010
CN    106650736 A    5/2017
(Continued)

OTHER PUBLICATIONS

Chiron, et al., Competition on Post-OCR Text Correction, 14th IAPR International Conference on Document Analysis and Recognition, Nov. 2017.

*Primary Examiner* — Samir A Ahmed
(74) *Attorney, Agent, or Firm* — Canon U.S.A., Inc. IP Division

(57) ABSTRACT

An image processing system which corrects a text obtained by optical character recognition (OCR) using a neural network which has performed learning based on a falsely recognized portion of OCR and a text near the falsely recognized portion is provided. The image processing system acquires a neural network model which has been trained based on learning data in which first text information included in print data and second text information acquired by performing optical character recognition (OCR) processing on an image that is based on the print data are associated with each other, acquires an image obtained by a scanner, acquires third text information which is generated by performing OCR processing on the image obtained by the scanner, and outputs fourth text information according to inputting of the third text information based on the neural network model.

28 Claims, 20 Drawing Sheets

(51) Int. Cl.
*G06K 9/72* (2006.01)
*G06N 3/08* (2006.01)
*G06T 1/00* (2006.01)

(52) U.S. Cl.
CPC .............. *G06N 3/08* (2013.01); *G06T 1/0007* (2013.01); *G06K 2209/011* (2013.01); *G06T 2207/20081* (2013.01); *G06T 2207/20084* (2013.01); *G06T 2210/32* (2013.01)

(58) Field of Classification Search
CPC .. G06K 9/6271; G06K 9/344; G06K 2209/01; G06N 3/08; G06N 3/084; G06N 3/0454; G06T 1/0007; G06T 2207/20081; G06T 2207/20084; G06T 2210/32; G06T 1/20; H04N 2201/0094; H04N 1/00331
See application file for complete search history.

(56) References Cited

U.S. PATENT DOCUMENTS

| | | | |
|---|---|---|---|
| 10,832,046 B1* | 11/2020 | Al-Gharaibeh | .... G06K 9/00442 |
| 2017/0004374 A1* | 1/2017 | Osindero | ............... G06K 9/325 |
| 2020/0005081 A1* | 1/2020 | Nah | .................. G06F 3/04883 |
| 2020/0320325 A1* | 10/2020 | Okuma | ................ G06K 9/6256 |

FOREIGN PATENT DOCUMENTS

| | | | |
|---|---|---|---|
| CN | 107357775 A | 11/2017 | |
| CN | 109002829 A | 12/2018 | |
| JP | 2011-150436 A | 8/2011 | |
| JP | 2011150436 A | 8/2011 | |

* cited by examiner

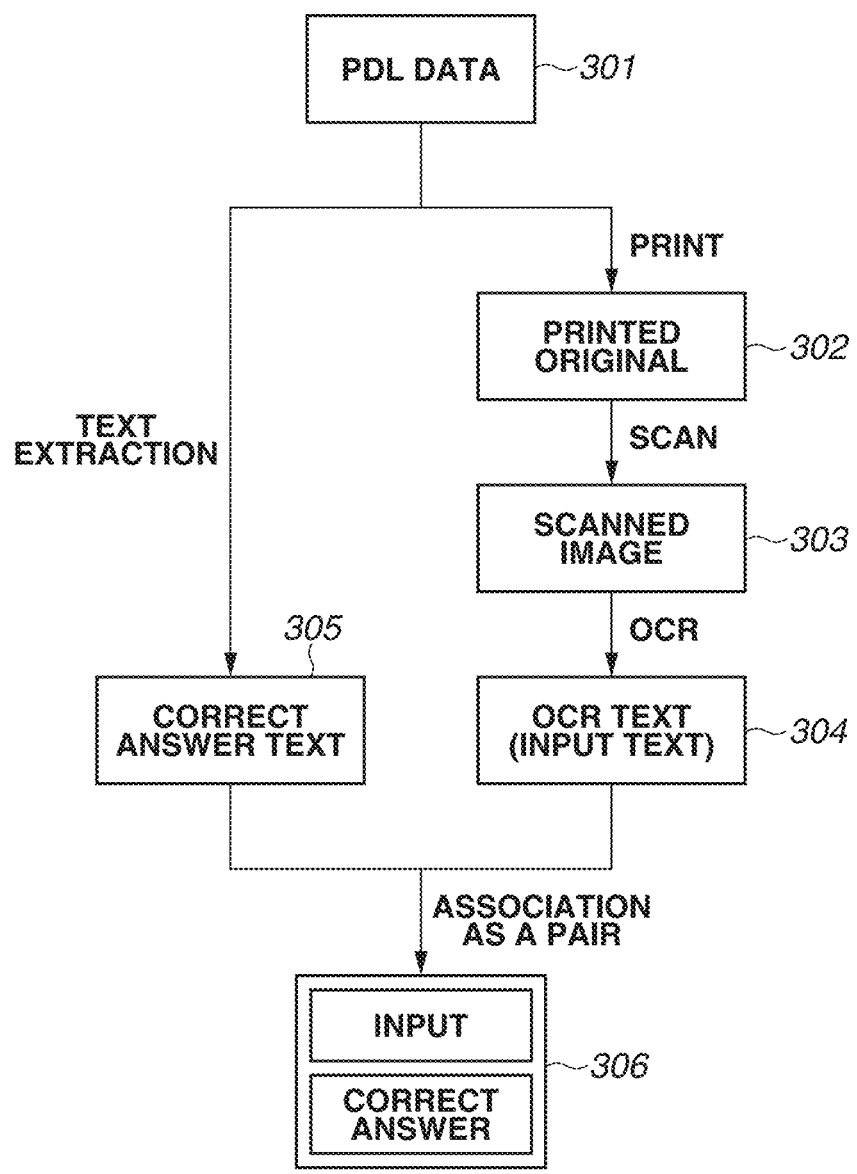

FIG.4

| ID | PRE-CONVERSION TEXT (402) | POST-CONVERSION TEXT (403) |
|---|---|---|
| 1 | そのため、紙粉除去賁[材]によりシートから紙粉が取りきれなくなってしまい、上述したように、ローラの周面に紙粉が残ることによるシート搬送性の低下やシートに紙粉の塊が付着してシートの画像不良に繋がるおそれがあった。 | そのため、紙粉除去部材によりシートから紙粉が取りきれなくなってしまい、上述したように、ローラの周面に紙粉が残ることによるシート搬送性の低下やシートに紙粉の塊が付着してシートの画像不良に繋がるおそれがあった。 |
| 2 | しかしながら、上記従来技術1のウインドウにおける黒画素領域の白画素線を認識する処理を行うジャギー補正では、1画素づつ境界線を認識し処理を行っているため、画素全体を処理するために、処理に相当の時間がかかるという問題が生じる。 | しかしながら、上記従来技術1のウインドウにおける黒画素領域の白画素線を認識する処理を行うジャギー補正では、1画素づつ境界線を認識し処理を行っているため、画素全体を処理するために、処理に相当の時間がかかるという問題が生じる。 |
| 3 | また、上記従来技術2のマルチビーム方式へ適用したジャギー補正処理の場合、画質の向上を図るために、ジャギー補正を個々に画像処理ブロックが必要であることから、個々の画像処理ブロックには1個月Jに画像補正データの設定が必要となるように、ジャギー本補正するためのデータの量の増大と、ジャギー補正をそ々うための手段の規模の拡大を招いてしまう操作をそうために、その処理操作を招いてしまう。 | また、上記従来技術2のマルチビーム方式へ適用したジャギー補正処理の場合、画質の向上を図るために、ジャギー補正を個々に画像処理ブロックが必要であることから、個々の画像処理ブロックには個別に画像補正データを補正するためのデータの量の増大と、ジャギー補正を行うための手段の規模の拡大を招いてしまう。 |
| ... | ... | ... |

400

404 — JAPANESE TEXT

1001  1002
[JAPANESE TEXT] 1003

1004 ⇨ 1005

1002
[JAPANESE TEXT]

FIG.10B

1012  1011
[JAPANESE TEXT]

1013 ⇨ 1014

[JAPANESE TEXT]
1015

FIG.10C

1022  1021
[JAPANESE TEXT]

1023 ⇨ 1024

[JAPANESE TEXT]
1025

The content of the frrst particleis20% by volume or more and 50% by volume or less of the total volume of the conductive layer.

*1104*  *1105*  *1106*

The content of the first particle is 20% by volume or more and 50% by volume or less of the total volume of the conductive layer.

*1107*

ENGLISH TEXT

CHINESE TEXT

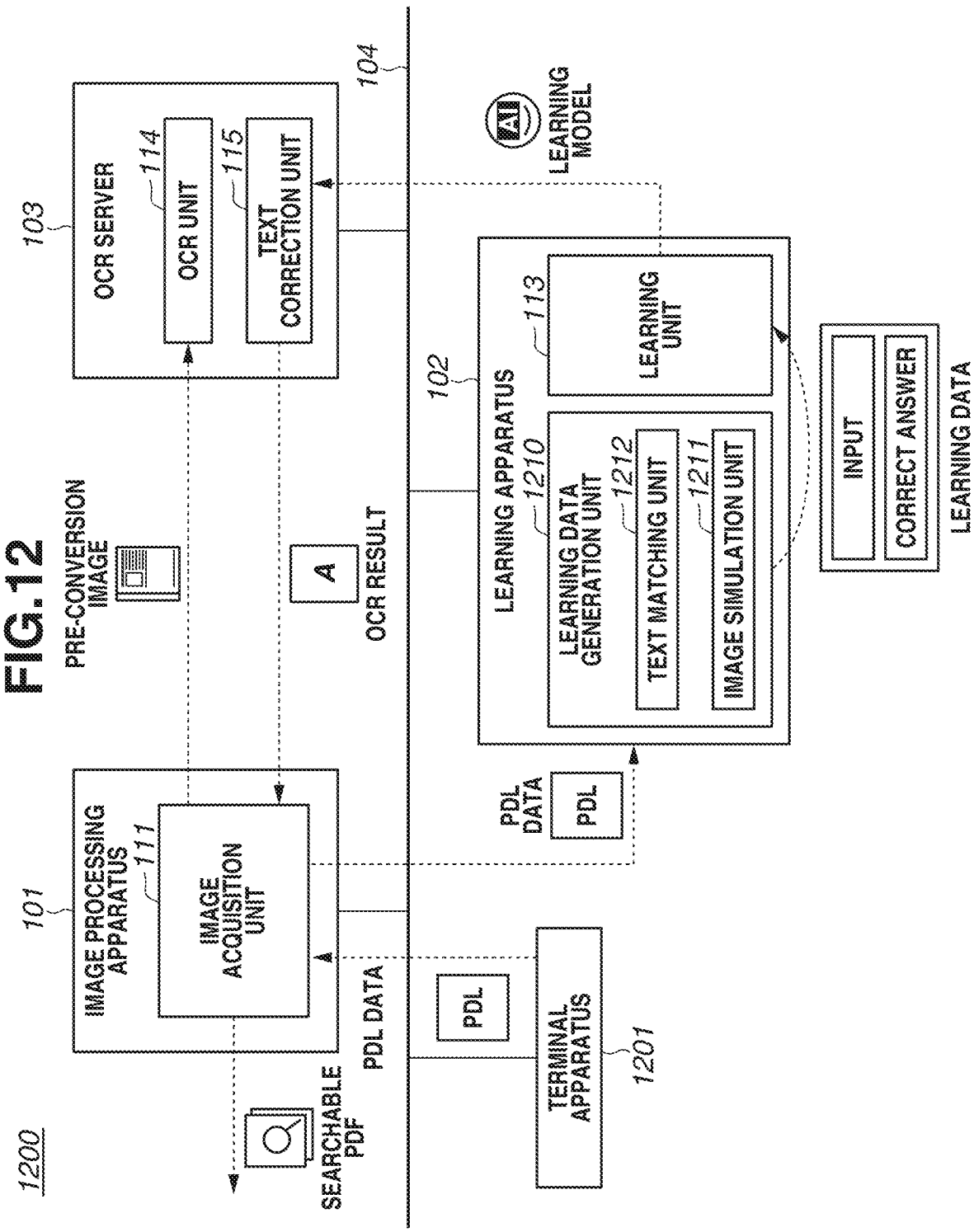

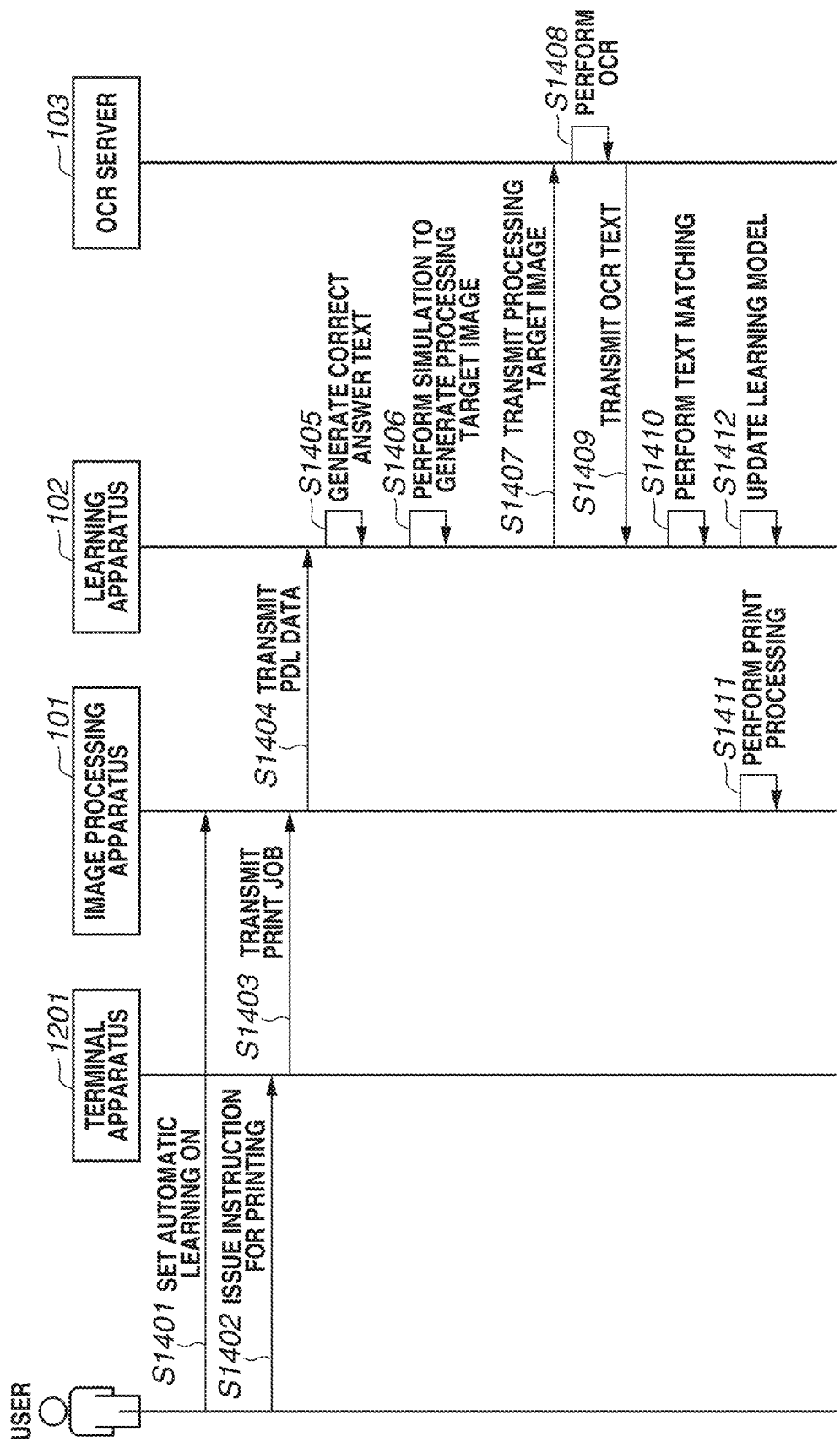

FIG.17

CORRECT ANSWER TEXT *1701*

すると、シール部材21の近傍において良好な現像を行うことができなくなることがあった。 *— 1702*

又、トナーの感光ドラム7への接触によって飛散したトナーがキャップコロと感光ドラム7が当接する部分に塊状で分散し、感光ドラム7と現像ローラ10cとの距離が大きく変動してしまって良好な現像を行うことができないことがあった。 *— 1703*

この問題に対して現像ローラ10cの長手方向においてシール部材21の位置にスクレーパ22を設け、このスクレーパ22を現像ローラ10cに接触させてトナーを掻き落とす方法が一般的に用いられている。 *— 1704* — JAPANESE TEXT

OCR TEXT *1705*

すると、シール部材21の近併において災好な現像を行うことができなくなることがあつた。 *— 1706*

又、トナーの騒光ドラム7への構触によって景欣したトナーがキャップコロと感光ドラム7が当披する部分に塊状で分散し、感光ドラム7と現像ロージ10cとの距館が大きく変動してしまつて良好な現像を行うことができないことがあつた。この問題に対して現像ローラ10cの民手方向においてンール部材21の位置にスクレーパ22を設け、このスクレーパ22を現像ロー,10cに披触させてトナーを機き滞とす方法が一般的に用いられている。 *— 1708 / 1707* — JAPANESE TEXT

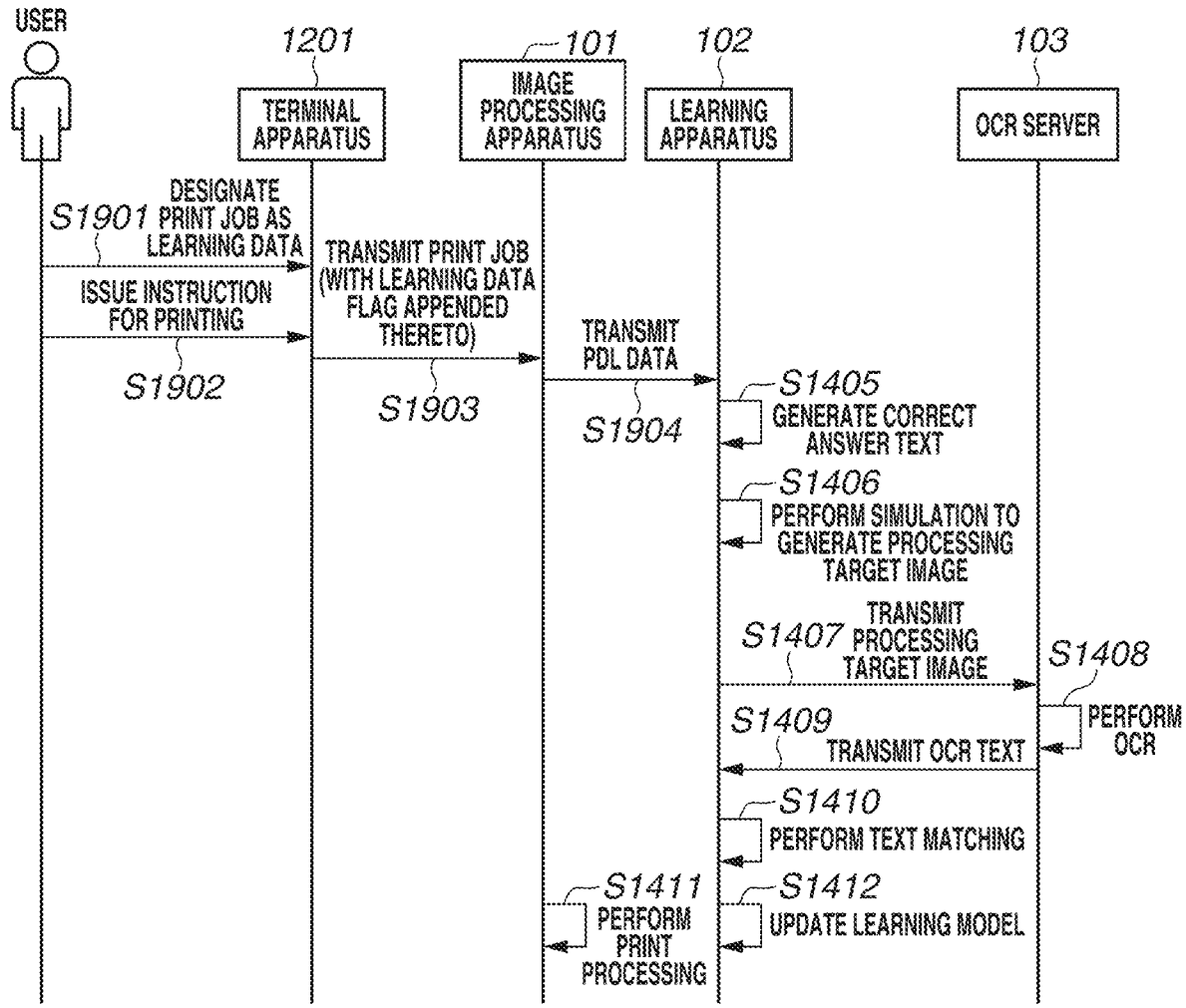

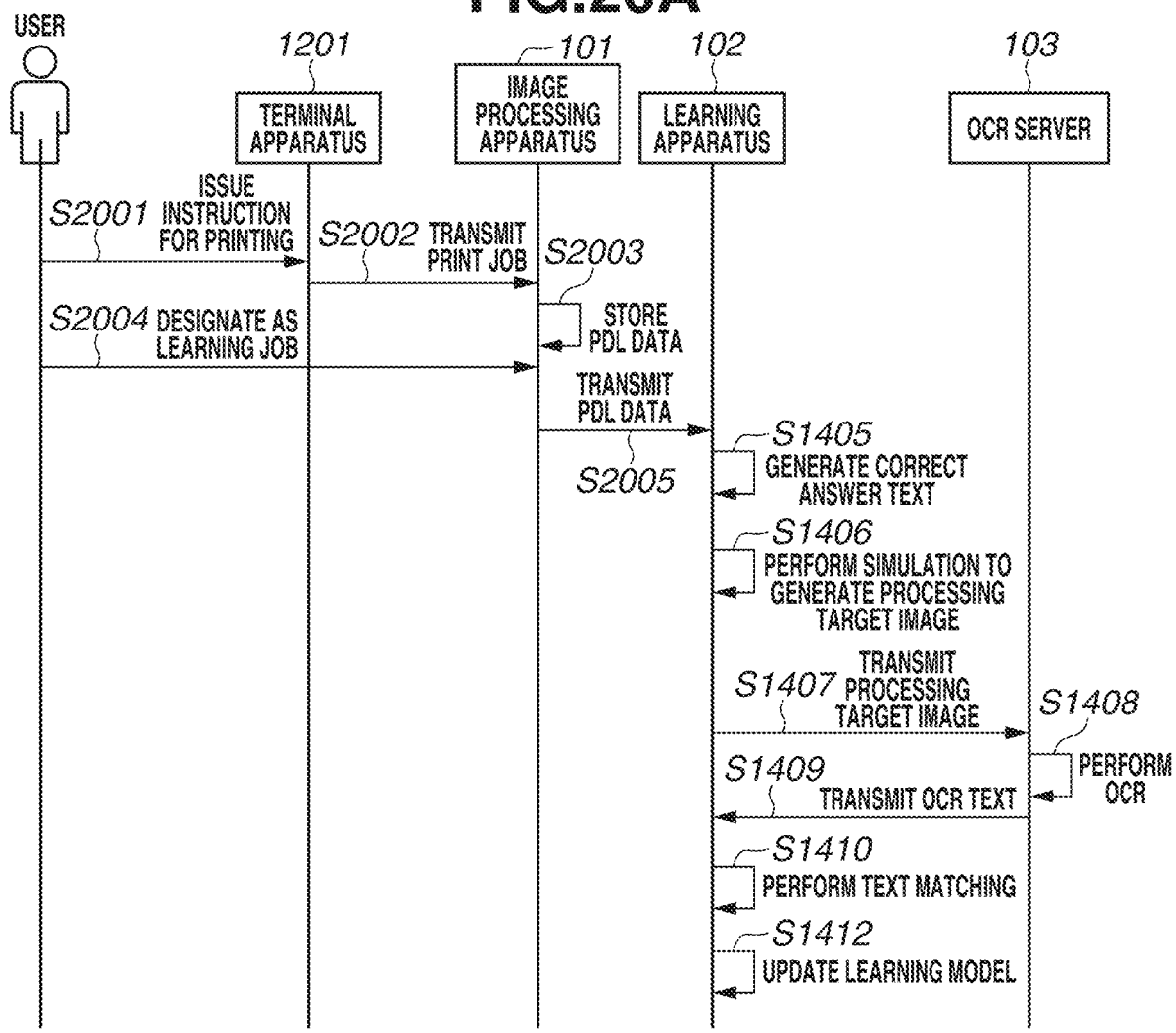

IMAGE PROCESSING SYSTEM AND IMAGE PROCESSING METHOD

BACKGROUND

Field

Aspects of the present generally relate to an image processing system and an image processing method.

Description of the Related Art

Known techniques to recognize a character image included in image data as characters and thus convert the character image into text data include a technique called "optical character recognition" (hereinafter referred to as "OCR"). OCR is used to utilize character information included in computerized data. For example, an image processing apparatus called, for example, a multifunction peripheral (MFP) is equipped with a function of combining text data acquired by OCR with image data to generate searchable Portable Document Format (PDF) data. The searchable PDF data allows searching a character image included in image data as characters, and is, therefore, excellent in convenience.

Furthermore, existing OCR techniques may often falsely recognize characters included in an image and output text data containing errors. Causes of such a false recognition include the influence of information other than characters, such as a background or ruled lines included in an image, the slant of an image, and the influence of a noise included in an image. If errors are contained in a text obtained by OCR in the above-mentioned way, the convenience of various functions using character information may decrease.

Japanese Patent Application Laid-Open No. 2011-150436 discusses a technique of creating an error rule for OCR and a dictionary for correction to correct a text obtained by OCR. The error rule is a rule for detecting a text correction target, and includes, for example, a rule of, in a case where, for example, one letter of katakana (a Japanese syllabary, one component of the Japanese writing system) appears between kanji (Chinese characters that are used in the Japanese writing system) and kanji, setting this letter of katakana as a correction target. In the case of this rule, a character

" 力 "

included in characters

" 重力 (katakana) 加速度 "

is set as a correction target. Moreover, the dictionary for correction retains, as a dictionary, patterns of false recognitions and correct contents. For example, a pair of characters " 重力 (katakana)"

and characters

" 重力 (kanki)"

is retained in the dictionary, and, in a case where the applicable pattern has appeared, processing for replacing the falsely recognized characters with corresponding correct contents is performed.

However, the technique discussed in Japanese Patent Application Laid-Open No. 2011-150436 has room for improvement in the accuracy of text correction. For example, in the case of such a type of false recognition that a character

" 動 "

is falsely recognized as a word

" 重力 ", the error rule described in Japanese Patent Application Laid-Open No. 2011-150436 is not able to detect such a false recognition. Moreover, if a rule and correction dictionary which, when having detected a word

" 重力 ", necessarily converts the word

" 重力 "

into a character

" 動 "

is used, a term which has been correctly recognized as characters

" 重力加速度 "

by OCR may be replaced with a different term such as characters

" 動加速度 ".

Accordingly, it is desirable that text correction processing to be performed after OCR be not correction processing to be performed on a word-by-word basis or on a character-by-character basis but correction processing to be performed in consideration of the context around a character or characters concerned. In other words, it is desirable that text correction processing be performed with use of a neural network which has performed learning based on not only a text of a falsely recognized portion by OCR but also a text appearing around the falsely recognized portion.

SUMMARY

According to an aspect of the present disclosure, an image processing system includes a unit configured to acquire a neural network model which has been trained based on learning data in which first text information included in print data and second text information acquired by performing optical character recognition (OCR) processing on an image that is based on the print data are associated with each other, a unit configured to acquire an image obtained by a scanner, a unit configured to acquire third text information which is generated by performing OCR processing on the image obtained by the scanner, and a unit configured to output fourth text information according to inputting of the third text information based on the neural network model.

Further features of the present disclosure will become apparent from the following description of exemplary embodiments with reference to the attached drawings.

BRIEF DESCRIPTION OF THE DRAWINGS

FIG. 3 is a diagram illustrating making-up of learning data.

FIG. 4 is a diagram illustrating an example of learning data.

FIG. 10A is a diagram illustrating a first example of text correction in Japanese.

FIG. 10B is a diagram illustrating a second example of text correction in Japanese. FIG. 10C is a diagram illustrating a third example of text correction in Japanese.

FIG. 11A is a diagram illustrating an example of text correction in English. FIG. 11B is a diagram illustrating an example of text correction in Chinese.

FIG. 12 is a diagram illustrating a configuration of an image processing system according to a second exemplary embodiment.

FIG. 14 is a diagram illustrating a learning sequence of the image processing system according to the second exemplary embodiment.

FIG. 17 is a diagram used to explain text matching.

FIG. 19A is a diagram illustrating a learning sequence of an image processing system according to a third exemplary embodiment. FIG. 19B is a diagram illustrating a printer driver screen.

FIG. 20A is a diagram illustrating a learning sequence of an image processing system according to a fourth exemplary embodiment. FIG. 20B is a diagram illustrating a print job selection screen.

DESCRIPTION OF THE EMBODIMENTS

Various exemplary embodiments, features, and aspects of the disclosure will be described in detail below with reference to the drawings. Furthermore, configurations for implementing the disclosure are not limited to only the configurations described in the following exemplary embodiments. Part or parts of the configurations described in the following exemplary embodiments can be omitted or replaced with equivalents thereof within the range in which similar effects are attained.

<Image Processing System>

Figure 1:
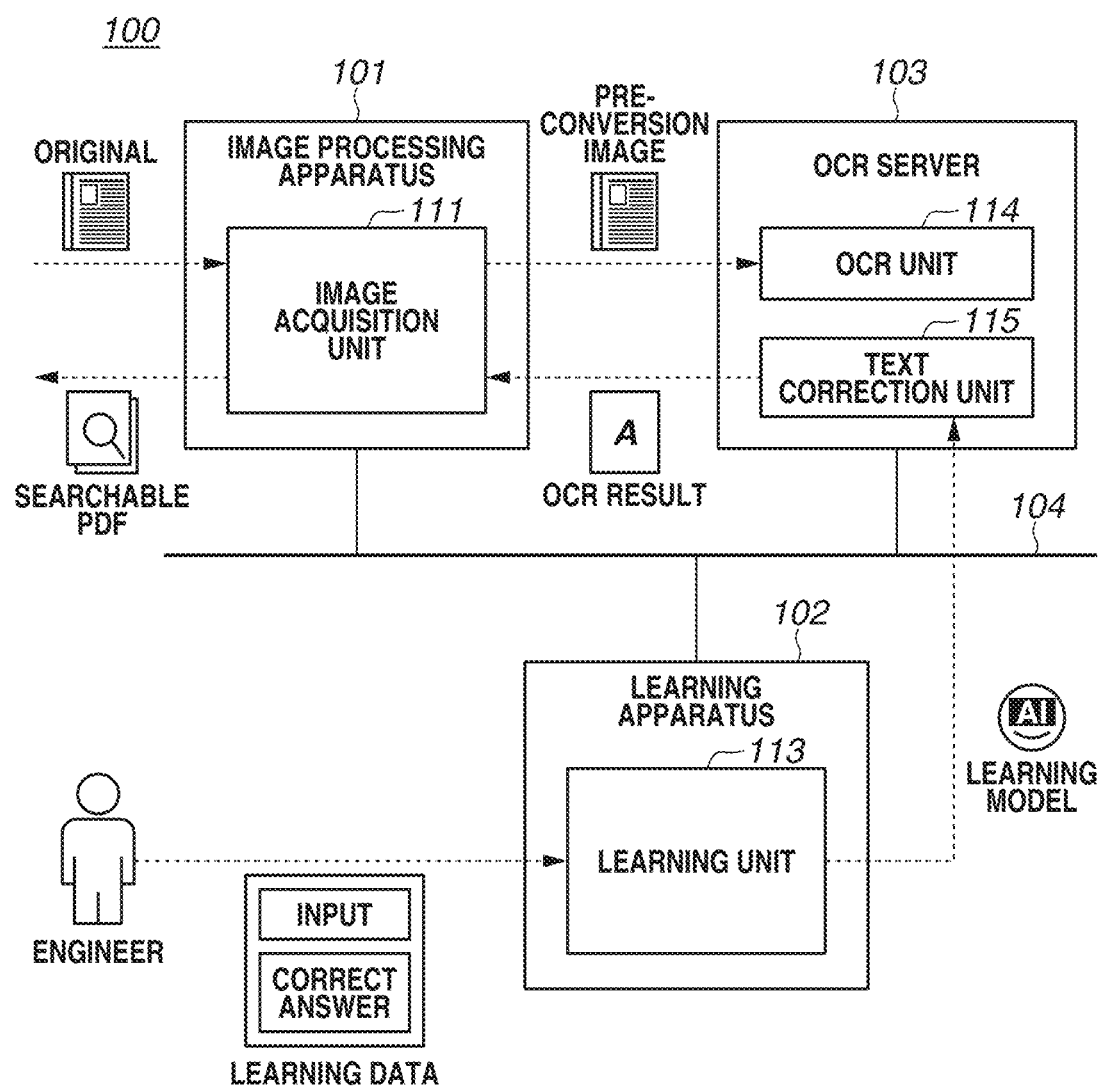
FIG. 1 is a diagram illustrating a configuration of an image processing system according to a first exemplary embodiment.

FIG. 1 is a diagram illustrating a configuration of an image processing system according to a first exemplary embodiment. The image processing system 100 includes an image processing apparatus 101, a learning apparatus 102, and an optical character recognition (OCR) server 103. The image processing apparatus 101, the learning apparatus 102, and the OCR server 103 are interconnected via a network 104.

The image processing apparatus 101, which is, for example, a multifunction peripheral (MFP), is an apparatus having a printing function and a scan function and functions as an image acquisition unit 111. The image processing apparatus 101 scans an original in which a character image is contained and thus generates scanned image data serving as a processing target (hereinafter, the generated scanned image data being referred to as a "processing target image"). Then, the image processing apparatus 101 transmits the processing target image to the OCR server 103 via the network 104.

The learning apparatus 102 performs learning of a series conversion model and thus functions as a learning unit 113, which generates a learning result (for example, parameters of a neural network). The learning apparatus 102 transmits the learning result to the OCR server 103 via the network 104.

The OCR server 103 functions as an OCR unit 114, which performs OCR processing on the processing target image generated by the image processing apparatus 101. The OCR server 103 extracts a partial image of a region in which characters included in the processing target image are contained (hereinafter, the partial image being referred to as a "character region image", and a character text acquired from original data from which to generate a processing target image being referred to as a "correct answer text"), and performs OCR on each character region image. Then, the OCR server 103 performs conversion using a neural network on a text acquired by OCR (hereinafter referred to as an "OCR text") with use of a learning result generated by the learning apparatus 102. Thus, the OCR server 103 serves as a text correction unit 115. Hereinafter, this conversion is referred to as "text artificial intelligence (AI) correction", and a text obtained by the text AI correction is referred to as a "corrected text". One of machine learning methods using neural networks includes deep learning using multi-layered neural networks. Then, the OCR server 103 transmits the corrected text acquired by conversion to the image processing apparatus 101. The image processing apparatus 101 generates scanned data as needed with use of the corrected text received from the OCR server 103, and then transmits the scanned data to a transmission destination desired by the user or stores the scanned data in, for example, a storage 208 (FIG. 2A) included in the image processing apparatus 101.

<Usage Sequence>

Figure 6:
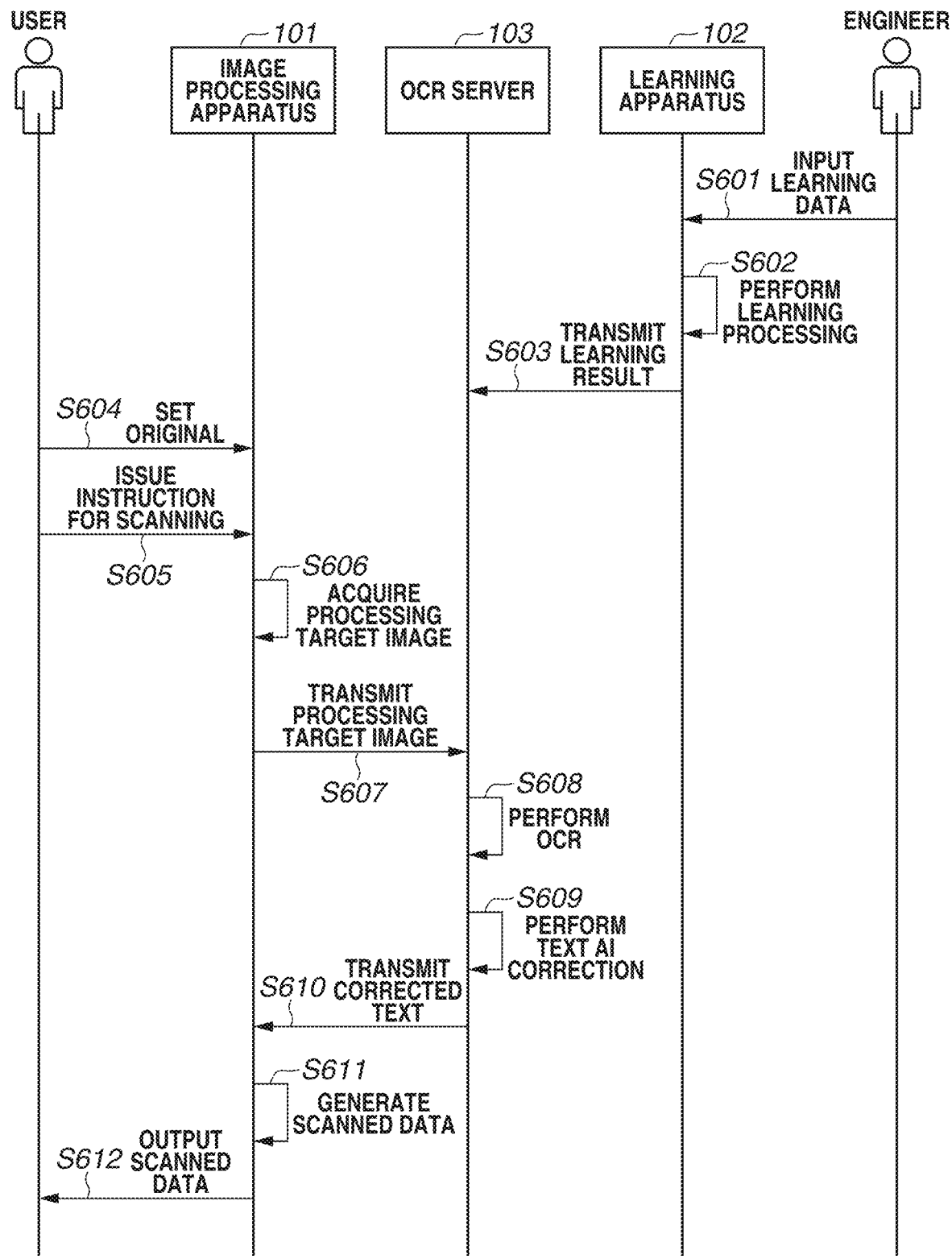
FIG. 6 is diagram illustrating a usage sequence for the image processing system.

FIG. 6 is a diagram illustrating a usage sequence of the image processing system. Here, a case where the user operates the image processing apparatus 101 to scan an original to generate searchable PDF data is described. In the first exemplary embodiment, since text AI correction is performed on a text obtained by OCR, a text higher in precision is able to be obtained. Therefore, it is possible to provide data higher in convenience (particularly, searchable PDF data) using such a precise text.

First, in step S601, the engineer of a manufacturer which provides the image processing system 100 performs inputting of learning data to cause the learning apparatus 102 to perform learning for text AI correction. In step S602, the learning apparatus 102 performs learning processing of a neural network with use of the input learning data. When processing in step S602 ends, then in step S603, the learning apparatus 102 transmits a learning result to the OCR server 103. These steps are steps which are previously performed before steps described below are performed.

Figure 2A:
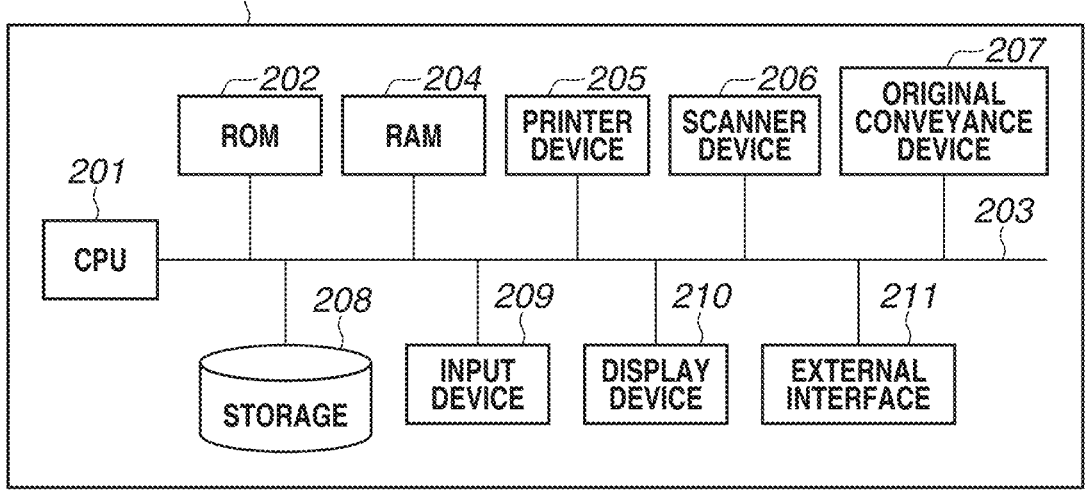
FIG. 2A is a diagram illustrating a configuration of an image processing apparatus.

Then, in step S604, to start using the image processing system 100, the user sets an original to be scanned on the image processing apparatus 101. The image processing apparatus 101 displays a setting screen such as that illustrated in FIG. 5A on a display device 210 (FIG. 2A). In step S605, the user issues an instruction for scanning via an input device 209 (FIG. 2A). In step S606, the image processing apparatus 101 reads an original with a scanner device 206 (FIG. 2A) to acquire a processing target image. In step S607, the image processing apparatus 101 transmits the acquired processing target image and setting information for text AI correction to the OCR server 103.

In step S608, the OCR server 103 performs OCR processing on the received processing target image to acquire an OCR text. In step S609, in a case where text AI correction processing is previously set ON in settings in the image processing apparatus 101, the OCR server 103 performs text AI correction processing on the OCR text acquired in step S608. The text AI correction processing is implemented by inputting an OCR text to a previously learned neural network model. In step S610, the OCR server 103 transmits a corrected text acquired in step S609 to the image processing apparatus 101. In step S611, the image processing apparatus 101 generates scanned data using the received text. The scanned data is data of the file format designated by the user within a region 501 illustrated in FIG. 5A, and, in a case where PDF and OCR have been designated, searchable PDF data in which text information is embedded is generated. In step S612, the image processing apparatus 101 performs data outputting by, for example, transmitting the generated scanned data to a transmission destination designated by the user.

<Apparatus Configurations>

Figure 2B:
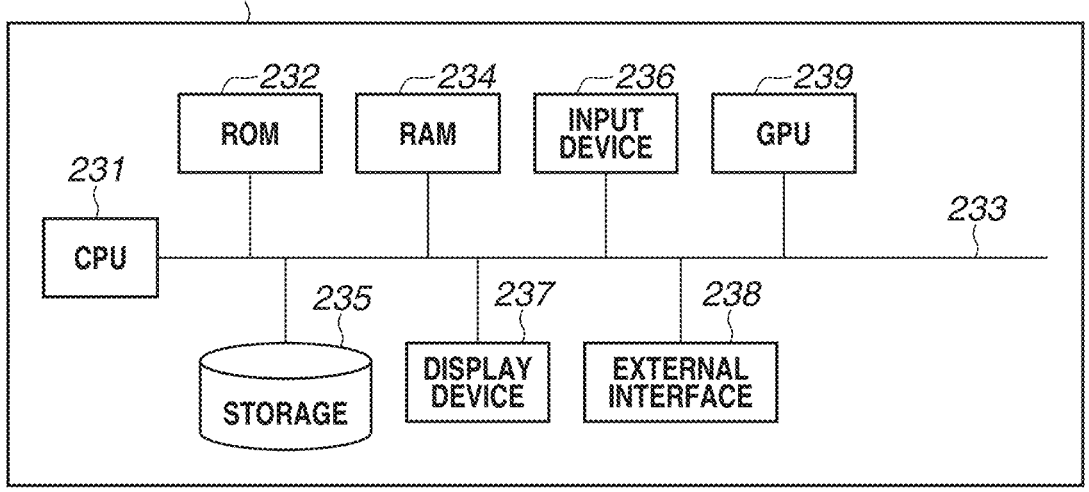
FIG. 2B is a diagram illustrating a configuration of a learning apparatus.
Figure 2C:
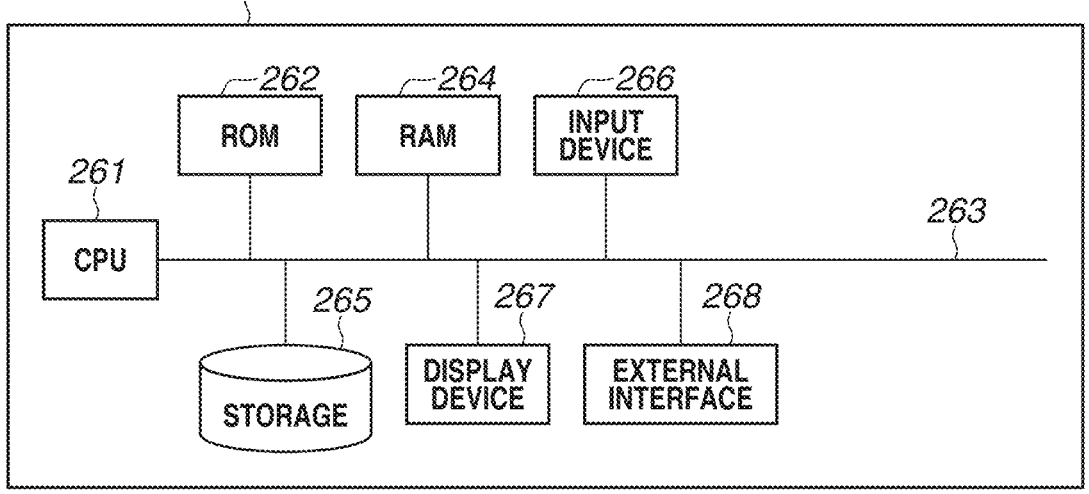
FIG. 2C is a diagram illustrating a configuration of an image processing server.

To implement the above-described image processing system, the image processing apparatus 101, the learning apparatus 102, and the OCR server 103 include the respective configurations described below. FIG. 2A is a diagram illustrating a configuration of the image processing apparatus 101. FIG. 2B is a diagram illustrating a configuration of the learning apparatus 102. FIG. 2C is a diagram illustrating a configuration of the OCR server 103.

As illustrated in FIG. 2A, the image processing apparatus 101 includes a central processing unit (CPU) 201, a read-only memory (ROM) 202, a random access memory (RAM) 204, a printer device 205, a scanner device 206, an original conveyance device 207, a storage 208, an input device 209, a display device 210, and an external interface 211. Such devices are interconnected via a data bus 203 in such a way as to be able to communicate with each other.

The CPU 201 is a controller which comprehensively controls the image processing apparatus 101. The CPU 201 activates an operating system (OS) by a boot program stored in the ROM 202. A control program stored in the storage 208 is executed on the OS. The control program is a program for controlling the image processing apparatus 101. The CPU 201 comprehensively controls various devices interconnected via the data bus 203. The RAM 204 operates as a temporary storage region, such as a main memory or work area, for the CPU 201.

The printer device 205 is a device (a printing device or image forming device) which prints image data on paper (recording material or sheet). The printer device 205 is of any one of, for example, an electrophotographic printing method, which uses, for example, a photosensitive drum or photosensitive belt, and an inkjet method, which directly prints an image on paper by ejecting ink from a minute nozzle array. The scanner device 206 is a device (image reading device), which performs scanning on an original, such as a paper document, with use of an optical reading device such as a charge-coupled device (CCD) sensor to obtain electrical signal data and converts the obtained electrical signal data into scanned image data. Moreover, the original conveyance device 207, such as an automatic document feeder (ADF), conveys an original placed on a document positioning plate of the original conveyance device 207 on a sheet-by-sheet basis to the scanner device 206. The scanner device 206 can include, in addition to the function of reading an original conveyed by the original conveyance device 207, the function of reading an original placed on a document positioning plate (not illustrated) included in the image processing apparatus 101.

The storage 208 is a non-volatile memory capable of reading and writing, such as a hard disk drive (HDD), in which various pieces of data, such as the above-mentioned control program, are stored. The input device 209 is configured with, for example, a touch panel or a hardware keypad. The input device 209 receives an operation instruction issued by the user. Then, the input device 209 transfers instruction information including an instruction position to the CPU 201. The display device 210 is a display, such as a liquid crystal display (LCD) or a cathode-ray tube (CRT). The display device 210 displays display data generated by the CPU 201. The CPU 201 determines which operation has been performed based on instruction information received from the input device 209 and display data displayed by the display device 210. Then, in response to a result of the determination, the CPU 201 controls the image processing apparatus 101, and also generates new display data and causes the display device 210 to display the new display data.

The external interface 211 performs transmission and reception of various pieces of data including image data with an external apparatus via a network, such as a local area network (LAN), a telephone line, or proximity wireless communication such as infrared communication. The external interface 211 receives page-description language (PDL) data (data in which drawing contents are described in page-description language or data of the PDL format) from an external apparatus, such as the learning apparatus 102 or a personal computer (PC) (not illustrated). The CPU 201 interprets PDL data received by the external interface 211 to generate an image. The generated image is printed by the printer device 205 or is stored in the storage 208. Moreover, the external interface 211 receives image data from an external apparatus, such as the OCR server 103. The received image data is printed by the printer device 205, is stored in the storage 208, or is transmitted to another external apparatus by the external interface 211.

The learning apparatus 102 illustrated in FIG. 2B includes a CPU 231, a ROM 232, a RAM 234, a storage 235, an input device 236, a display device 237, an external interface 238, and a graphics processing unit (GPU) 239. Such various units are capable of mutually transmitting and receiving data via a data bus 233.

The CPU 231 is a controller which controls the entire learning apparatus 102. The CPU 231 activates an OS by a boot program stored in the ROM 232, which is a non-volatile memory. The CPU 231 executes, on the OS, a learning data generation program and a learning program stored in the storage 235. The CPU 231 generates learning data by executing the learning data generation program. Moreover, the CPU 231 learns neural networks for performing text AI correction by executing the learning program. The CPU 231 controls various units via a bus such as the data bus 233.

The RAM 234 operates as a temporary storage region, such as a main memory or work area, for the CPU 231. The storage 235 is a non-volatile memory capable of reading and writing, and records the above-mentioned learning program thereon.

The input device 236 is configured with, for example, a mouse and a keyboard. The display device 237 is similar to the display device 210 described with reference to FIG. 2A.

The external interface 238 is similar to the external interface 211 described with reference to FIG. 2A.

The GPU 239, which is an image processing processor, performs learning of neural networks in collaboration with the CPU 231.

The OCR server 103 illustrated in FIG. 2C includes a CPU 261, a ROM 262, a RAM 264, a storage 265, an input device 266, a display device 267, and an external interface 268. Such various units are capable of mutually transmitting and receiving data via a data bus 263.

The CPU 261 is a controller which controls the entire OCR server 103. The CPU 261 activates an OS by a boot program stored in the ROM 262, which is a non-volatile memory. The CPU 261 executes, on the OS, an OCR server program stored in the storage 265. The CPU 261 performs OCR processing and conversion processing on a processing target image by executing the OCR server program. The CPU 261 controls various units via a bus such as the data bus 263.

The RAM 264 operates as a temporary storage region, such as a main memory or work area, for the CPU 261. The storage 265 is a non-volatile memory capable of reading and writing, and records the above-mentioned OCR server program thereon.

The input device 266 is similar to the input device 236 described with reference to FIG. 2B. The display device 267 is similar to the display device 210 described with reference to FIG. 2A.

The external interface 268 is similar to the external interface 211 described with reference to FIG. 2A.

<Learning Data>

The learning data which the engineer has input to the learning apparatus 102 in step S601 is described. The learning data is data which the learning unit 113 uses to learn neural networks. Learning neural networks necessitates a pair of pre-conversion data (data not yet converted) and post-conversion data (data obtained by conversion). In the first exemplary embodiment, an OCR text is used as pre-conversion data, and a correct answer text is used as post-conversion data. FIG. 4 is a diagram illustrating an example of learning data which the storage 235 retains.

Therefore, in the storage 235, the input learning data is retained in a state indicated in a list 400. As illustrated in FIG. 4, OCR texts are retained in a pre-conversion text column 402, and correct answer texts are retained in a post-conversion text column 403. The pre-conversion text column 402 contains, for example, character strings 404 which have been falsely recognized. The learning unit 113 performs learning while referring to an identifier (ID) in an ID column 401 and calling up a pair of an OCR text and a correct answer text as appropriate.

Furthermore, the OCR text does not necessarily contain character strings 404 which have been falsely recognized, but can contain a pair of an OCR text and a correct answer text which are identical to each other. This is because, in actual inputting, there can also exist a text which does not contain false recognition. Moreover, this is because such an effect as to cause a neural network to learn a correct context can also be attained.

Moreover, the above-mentioned form of retention of learning data is merely an example, and the form of retention of learning data is not limited to the above-mentioned form as long as a pair of pre-conversion and post-conversion texts is able to be correctly acquired therefrom.

FIG. 3 is a diagram illustrating making-up of learning data. As illustrated in FIG. 3, learning data 306 is data composed of a pair of a correct answer text and an OCR text (input text). A correct answer text 305 is directly acquired from PDL data 301 (electronic document) by, for example, extracting character attribute objects therefrom. An OCR text 304 (input text) is obtained by scanning a printed original 302 obtained by printing the PDL data 301 to generate a scanned image 303 and then performing OCR processing on the scanned image 303.

Here, the printed original 302 is obtained by a printing apparatus (not illustrated) which is under a development environment of the engineer. Next, the printed original 302 is read by a scanner (not illustrated) which is under a development environment of the engineer. Then, OCR processing is performed on the scanned image 303 by an information processing apparatus (not illustrated) which is under a development environment of the engineer. It is desirable that apparatuses for use in such processes be of the same models as those of the printer device 205 and the scanner device 206. Moreover, it is desirable that software for use in OCR processing be the same as software used in the OCR server 103.

Moreover, while performing accurate text correction necessitates learning neural networks using large quantities of learning data, here, description is performed on the premise that sufficient learning has previously been performed.

<Operation Screen>

Figure 5A:
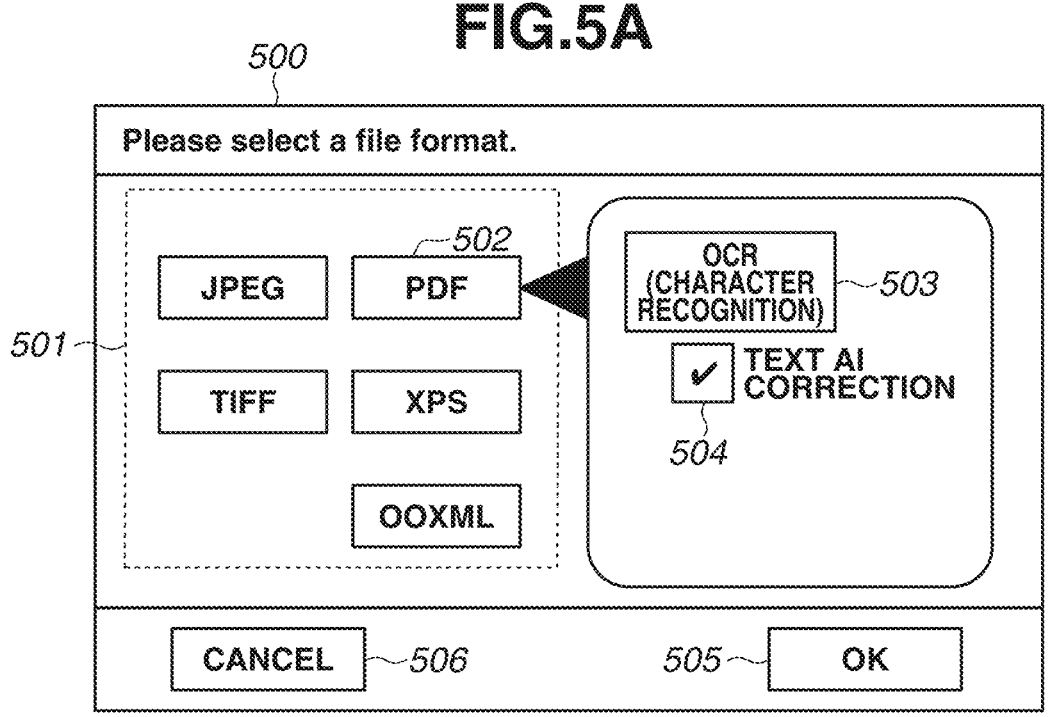
FIG. 5A is a diagram illustrating a setting screen for a scan function.
Figure 5B:
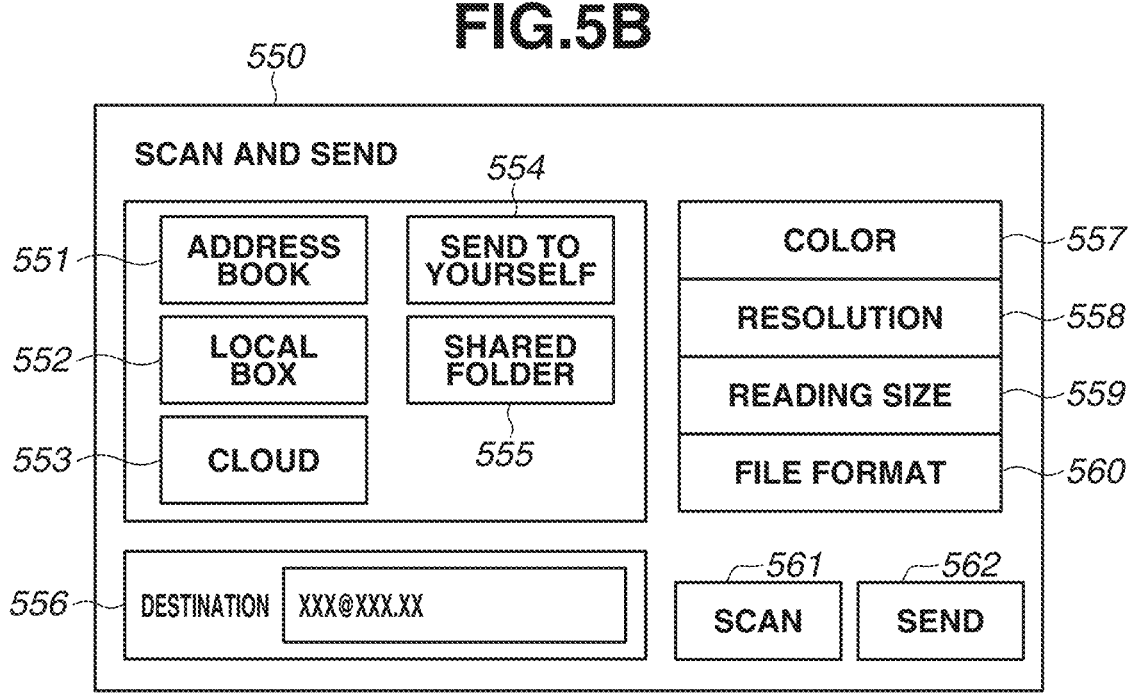
FIG. 5B is a diagram illustrating a transmission instruction screen for the scan function.

FIG. 5A is a diagram illustrating a setting screen for the scan function. FIG. 5B is a diagram illustrating a transmission instruction screen for the scan function.

In a case where an instruction to use the scan function has been issued via the input device 209 of the image processing apparatus 101, the image processing apparatus 101 displays a transmission instruction screen 550 on the display device 210. The transmission instruction screen 550 includes destination setting buttons 551, 552, 553, 554, and 555, a destination field 556, reading method designation buttons 557, 558, 559, and 560, a scan button 561, and a send button 562.

The scan button 561 is a button used to start reading of an original set on the scanner device 206. A plurality of images can be scanned and retained by replacing an original set on the scanner device 206 with another original and re-selecting the scan button 561. Furthermore, in a case where an ADF is used, images for a plurality of pages can be scanned and retained by selecting the scan button 561 once more.

The send button 562 is a button used to send an image obtained by scanning performed in response to selection of the scan button 561 to a destination set in the destination field 556.

The destination field 556 is a field used to indicate a destination set via, for example, the destination setting button 551, 552, 553, 554, or 555. For example, causing a software keyboard (not illustrated) to be displayed also enables directly entering a destination into the destination field 556.

The destination setting button 551 is a button used to call up a screen (not illustrated) for designating a destination from among an address book. The address book is stored locally or in a server, and, in the address book, user names and corresponding e-mail addresses are associated with each other. In the called-up screen, these pieces of information are displayed in a list form and in a selectable manner.

The destination setting button 552 is a button used to call up a screen (not illustrated) for designating a local box as a destination. The local box is a data storage region obtained by using the storage 208 (a storage region allocated in the storage 208, which is a local storage), and, in the local box, a plurality of boxes is managed with, for example, the respective box numbers. In the called-up screen, for example, the box number of a box to be designated as a destination is able to be specified.

The destination setting button 553 is a button used to call up a screen (not illustrated) for designating a cloud service (cloud server) as a destination. The cloud service is a data storage service capable of storing data. In the called-up screen, for example, designation of a service to be used and setting of an account are able to be performed.

The destination setting button 554 is a button used to designate an e-mail address associated with the user who is logged in. This button enables designating, with one touch, for example, an e-mail address associated with the user who is logged in as a destination.

The destination setting button 555 is a button used to call up a screen (not illustrated) for designating a shared folder on a network (a shared folder which another apparatus network-connected to the image processing apparatus 101 provides) as a destination. The shared folder is provided by, for example, another apparatus (not illustrated) on a local network to which the image processing apparatus 101 belongs. In the called-up screen, for example, address setting or various network settings are able to be performed.

The reading method designation button 557 is a button used to call up a screen available for designating the color of an image obtained by a scanner, such as color or monochrome.

The reading method designation button 558 is a button used to call up a screen for designating the resolution of a read image, such as 300×300 dots per inch (dpi) or 600×600 dpi.

The reading method designation button 559 is a button used to call up a screen available for designating the read size of a read image, such as auto, A4, or A5.

The reading method designation button 560 is a button used to call up a screen 500 available for designating the conversion form of a read image.

The setting screen 500 includes a setting button group 501 for setting the file formats of image data, and the setting button group 501 includes setting buttons respectively corresponding to JPEG, PDF, TIFF, XPS, and OOXML, which are able to be selected as the file format of image data. The image processing apparatus 101 converts image data into data of the file format corresponding to a setting button which the user has selected from among the setting button group 501. For example, when the user has selected a PDF button 502, an OCR button 503 for setting whether to perform OCR processing required for generation of searchable PDF data is displayed as detailed information. Moreover, when the user has selected the OCR button 503, a text AI correction button 504 is displayed as detailed information. In a case where the text AI correction button 504 is checked, text AI correction processing described below is performed on text data obtained by OCR processing. When an OK button 505 is selected, setting contents set via the setting screen 500 are stored and the setting screen 500 transitions to the transmission instruction screen 550.

When a cancel button 506 is selected, setting contents set via the setting screen 500 are discarded and the setting screen 500 transitions to the transmission instruction screen 550.

Furthermore, the above-mentioned contents are merely examples for describing the present exemplary embodiment, and the setting screen and setting items are not limited to the above-mentioned ones. For example, a button used to select a language targeted for OCR can be displayed in the setting screen. Moreover, setting for enabling or disabling of text AI correction can be provided in not the screen which is displayed at the time of an instruction for the scan function but a screen for performing setting of the entire image processing apparatus 101. Moreover, not a configuration in which enabling or disabling of text AI correction is explicitly switched by the user but a configuration in which text AI correction is always performed can also be employed.

<Learning Processing>

Figure 7:
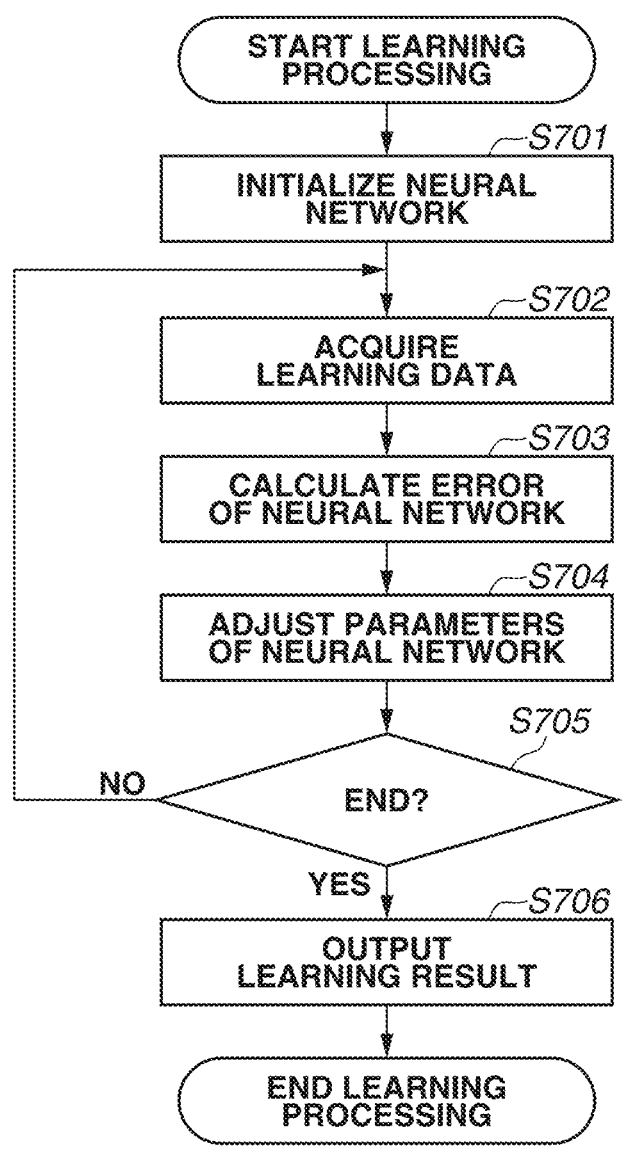
FIG. 7 is a flowchart illustrating a flow of learning processing.

Next, learning processing which is performed by the learning apparatus 102 is described. FIG. 7 is a flowchart illustrating the learning processing. The learning processing is implemented by the learning unit 113 of the learning apparatus 102. Specifically, the learning processing is implemented by the CPU 231 reading out a learning program recorded on the storage 235, loading the learning program onto the RAM 234, and executing the learning program. The learning processing is started in response to new learning data being input. Furthermore, in the first exemplary embodiment, a mini-batch method is assumed to be used for learning of a neural network.

First, in step S701, the CPU 231 initializes a neural network. More specifically, the CPU 231 builds out a neural network, and initializes the neural network by randomly determining values of respective parameters included in the neural network. The structure of a neural network to be built out can be any type, and, for example, can be the form of a known series conversion model. The series conversion regards a sentence as a series of, for example, words or characters, receives the series as sequential inputs, and interprets information about, for example, a context included in the series within a model. Then, the series conversion sequentially inputs the series similarly based on the interpreted contents, thus implementing conversion.

In step S702, the CPU 231 acquires learning data. The CPU 231 acquires learning data retained in the storage 235 by reading out a predetermined number of pieces (a mini-batch size, for example, 10 pieces) of learning data therefrom. Furthermore, the unit of text targeted for inputting differs depending on a method of learning of neural networks. Therefore, separation processing of text is performed for each piece of learning data as needed. The separation processing includes, for example, separating words in Japanese with spaces in the case of word by word and separating characters in Japanese with spaces in the case of character by character. Furthermore, while, in the first exemplary embodiment, description is performed with the unit of separation set as character by character, the unit of separation or the method of separation is not limited to this, but can be any form as long as the present disclosure can be implemented.

In step S703, the CPU 231 calculates an error of the neural network. More specifically, the CPU 231 inputs an OCR text contained in each piece of learning data to the neural network and then obtains an output therefrom. The obtained output is a variable-length text, and the CPU 231 evaluates a difference between the output text (corrected text) and a correct answer text corresponding thereto, thus obtaining an error of the neural network. For the evaluation, cross entropy can be used as an index.

In step S704, the CPU 231 adjusts parameters of the neural network. More specifically, the CPU 231 changes parameter values of the neural network by a backpropagation method based on the error calculated in step S703.

In step S705, the CPU 231 determines whether to end learning. The CPU 231 performs this determination as follows. The CPU 231 determines whether processing in steps S702 to S704 has been performed a predetermined number of times (for example, 60,000 times). The predetermined number of times can be determined by, for example, the user performing a manual inputting operation at the time of starting of the present flowchart. If it is determined that processing in steps S702 to S704 has been performed the predetermined number of times (YES in step S705), the CPU 231 advances the processing to step S706. If not so (NO in step S705), the CPU 231 returns the processing to step S702, in which the CPU 231 continues learning of the neural network.

In step S706, the CPU 231 transmits the parameters of the neural network adjusted in step S704 as a learning result to the OCR server 103.

<Scan Processing>

Figure 8A:
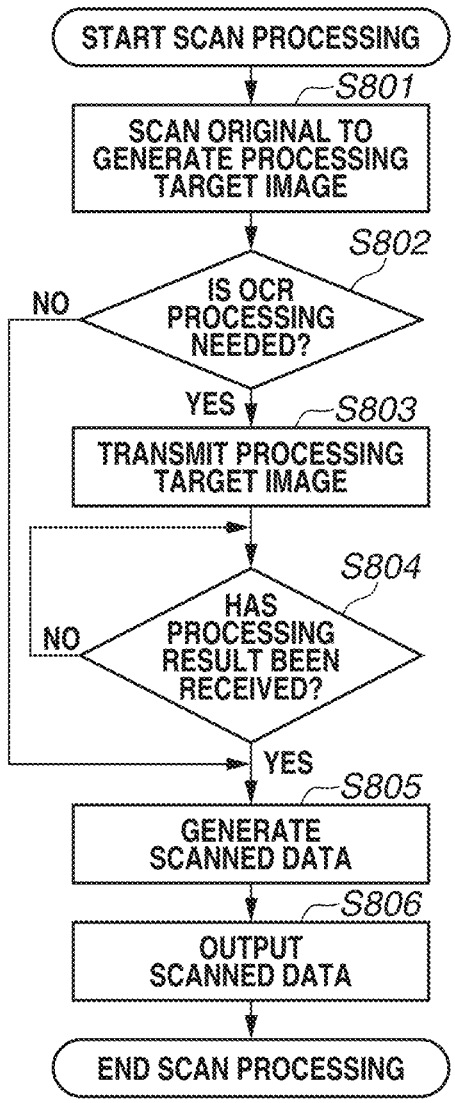
FIG. 8A is a flowchart illustrating a flow of scan processing.

Next, scan processing which is performed by the image processing apparatus 101 is described. The image processing apparatus 101 scans an image containing character images, and transmits the scanned image to the OCR server 103 to request the OCR server 103 to perform OCR processing thereon. FIG. 8A is a flowchart illustrating the scan processing. The scan processing is implemented by the CPU 201 of the image processing apparatus 101 reading out a controller program recorded on the storage 208, loading the controller program onto the RAM 204, and executing the controller program. The scan processing is started in response to the user performing a predetermined operation via the input device 209 of the image processing apparatus 101.

First, in step S801, the CPU 201 controls the scanner device 206 and the original conveyance device 207 to scan an original, thus generating a processing target image. The processing target image is generated as full-color (three channels of red (R), Green (G), and blue (B)) image data.

In step S802, the CPU 201 determines whether OCR processing is needed. If it is determined that scan setting which needs OCR processing is previously set by the user (YES in step S802), the CPU 201 advances the processing to step S803. If not so (NO in step S802), the CPU 201 advances the processing to step S805.

In step S803, the CPU 201 transmits the processing target image generated in step S801 to the OCR server 103 via the external interface 211.

In step S804, the CPU 201 determines whether a processing result has been received from the OCR server 103. If it is determined that a processing result has been received from the OCR server 103 via the external interface 211 (YES in step S804), the CPU 201 advances the processing to step S805. If not so (NO in step S804), the CPU 201 repeats processing in step S804.

In step S805, the CPU 201 generates scanned data using the processing result received from the OCR server 103. The processing result received from the OCR server 103 is, in other words, a corrected text obtained as a result of performing OCR and text AI correction on the processing target image generated in step S801. The scanned data generated in step S805 is data having a file format which the user has set at the time of a scan instruction, and, in a case where the PDF format has been designated, searchable PDF data with character information embedded therein is generated as the scanned data.

In step S806, the CPU 201 outputs the scanned data generated in step S805. The method of outputting the scanned data includes transmitting the scanned data to a transmission destination, which the user has set by operating the input device 209, via the external interface 211. Alternatively, the method of outputting the scanned data includes storing the scanned data in a storage region in the storage 208, which the user has set by operating the input device 209.

<OCR Processing>

Figure 8B:
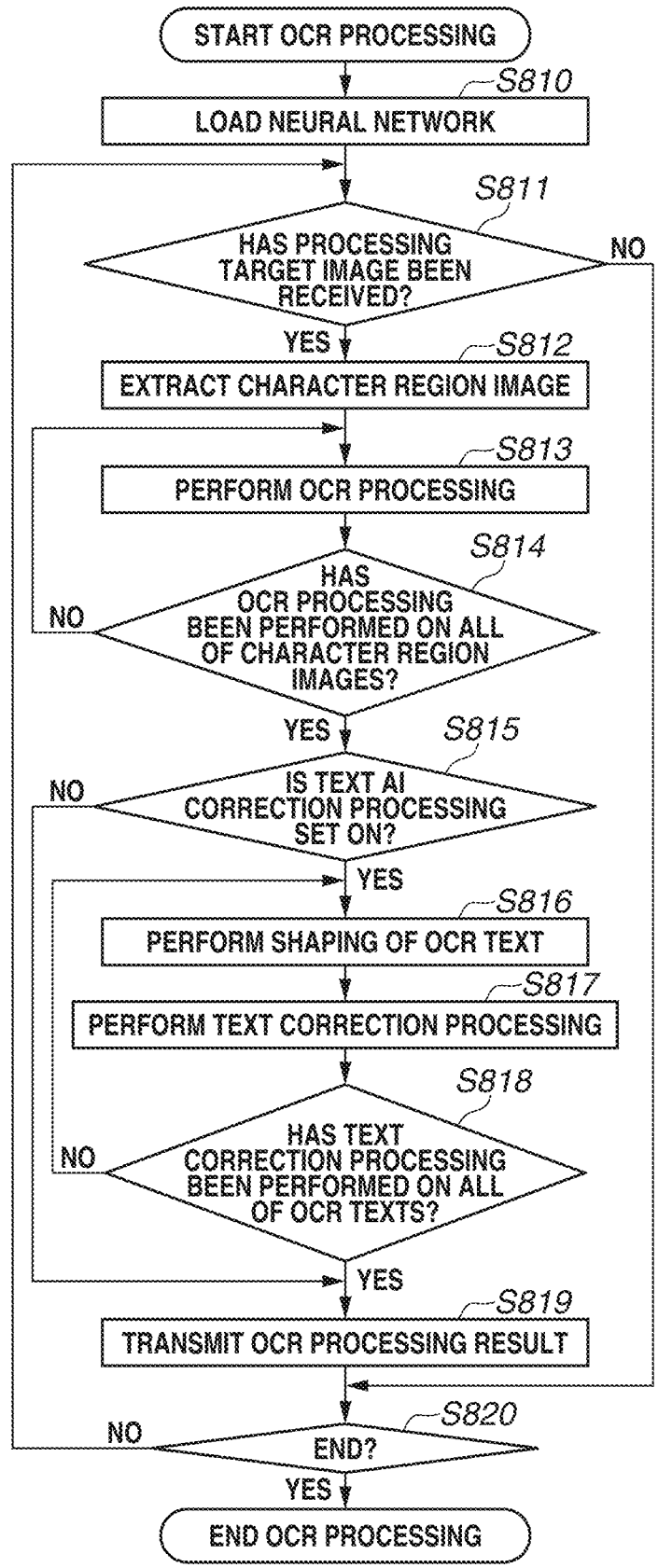
FIG. 8B is a flowchart illustrating a flow of optical character recognition (OCR) processing.

Next, OCR processing which is performed by the OCR server 103 is described. The OCR server 103 performs OCR processing on the processing target image received from the image processing apparatus 101. FIG. 8B is a flowchart illustrating the OCR processing. The OCR processing is implemented by the CPU 261 reading out an OCR server program stored in the storage 265, loading the OCR server program onto the RAM 264, and executing the OCR server program. The OCR processing is started in response to the user powering on the OCR server 103.

First, in step S810, the CPU 261 loads a neural network in which to perform text AI correction. The CPU 261 builds out a neural network identical with that built out in step S701 in the flowchart of FIG. 7. Then, the CPU 261 reflects, in the built-out neural network, the learning result (parameters of the neural network) transmitted from the learning apparatus 102 in step S706 in the flowchart of FIG. 7.

In step S811, the CPU 261 determines whether a processing target image has been received from the image processing apparatus 101. If it is determined that a processing target image has been received via the external interface 268 (YES in step S811), the CPU 261 advances the processing to step S812. If not so (NO in step S811), the CPU 261 advances the processing to step S820.

Figure 9A:
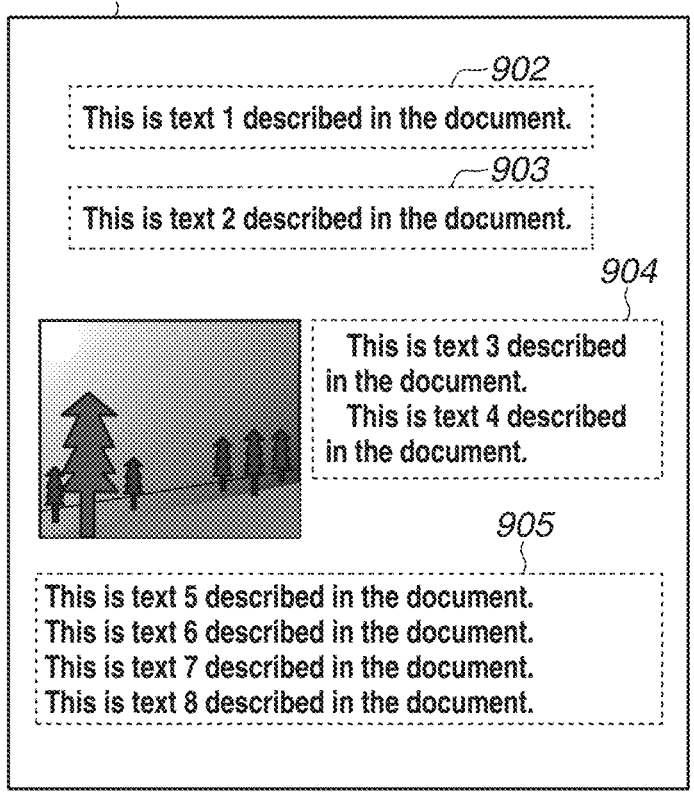
FIG. 9A is a diagram illustrating a configuration of a read original.

In step S812, the CPU 261 extracts a character region image from the processing target image received from the image processing apparatus 101. Extraction of a character region can be implemented by application of a known technique. An example of extracting a character region image from a processing target image is illustrated in FIG. 9A. FIG. 9A is a diagram illustrating a configuration of a read original. When extraction of a character region image is performed, rectangular regions 902 to 905 each containing characters are detected from a processing target image 901 for one page, so that partial images of the detected rectangular regions are extracted. In a case where, as in the illustrated example, characters present in a processing target image are present in a separate manner, a plurality of character regions may be detected, so that a plurality of character region images may be obtained.

Figure 9B:
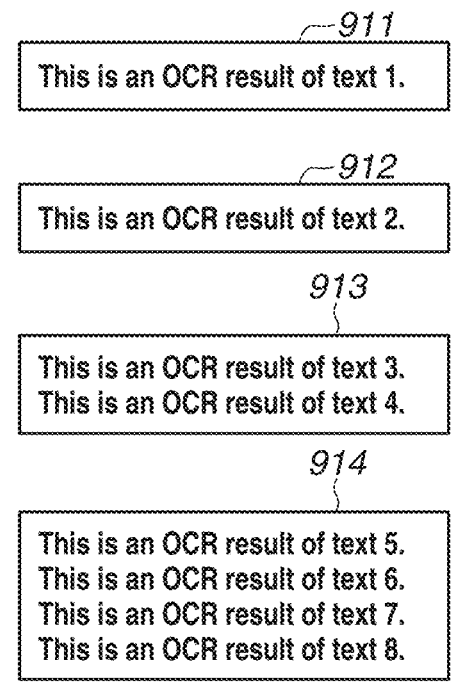
FIG. 9B is a diagram illustrating OCR results.

In step S813, the CPU 261 performs OCR on the character region image acquired in step S812. The OCR enables acquiring an OCR text which is a result of recognizing characters contained in the character region image as text. The OCR can be implemented by application of a known technique. An example of acquiring an OCR text from a character region image is illustrated in FIG. 9B. FIG. 9B is a diagram illustrating an OCR result. A text 911 to a text 914 are texts obtained by performing OCR on the respective rectangular regions 902 to 905, each of which represents the character region image acquired in step S812. As mentioned above, depending on processing target images, a plurality of character region images is acquired, and, since OCR is performed on all of the acquired character region images, a plurality of OCR texts are also acquired.

In step S814, the CPU 261 determines whether OCR has been performed on all of the character region images acquired in step S812. If it is determined that OCR has been performed on all of the character region images (YES in step S814), the CPU 261 advances the processing to step S815. If not so (NO in step S814), the CPU 261 returns the processing to step S813.

In step S815, the CPU 261 determines whether setting of text AI correction processing is ON. If it is determined that setting of text AI correction processing is ON (YES in step S815), the CPU 261 advances the processing to step S816. If not so (NO in step S815), the CPU 261 advances the processing to step S819.

In step S816, the CPU 261 performs shaping of an OCR text. The CPU 261 performs segmentation into units of input on the OCR text acquired in step S813. The unit of input used herein has a format similar to that used when the neural network built out in step S810 has been learned. Moreover, in a case where a targeted OCR text is composed of a plurality of sentences or is a short sentence, the CPU 261 can perform text segmentation or text join into a predetermined sentence volume (for example, a unit of two sentences when characters up to a period are regarded as one sentence or the number of sentences each containing characters the number of which exceeds a predetermined number).

Figure 9C:
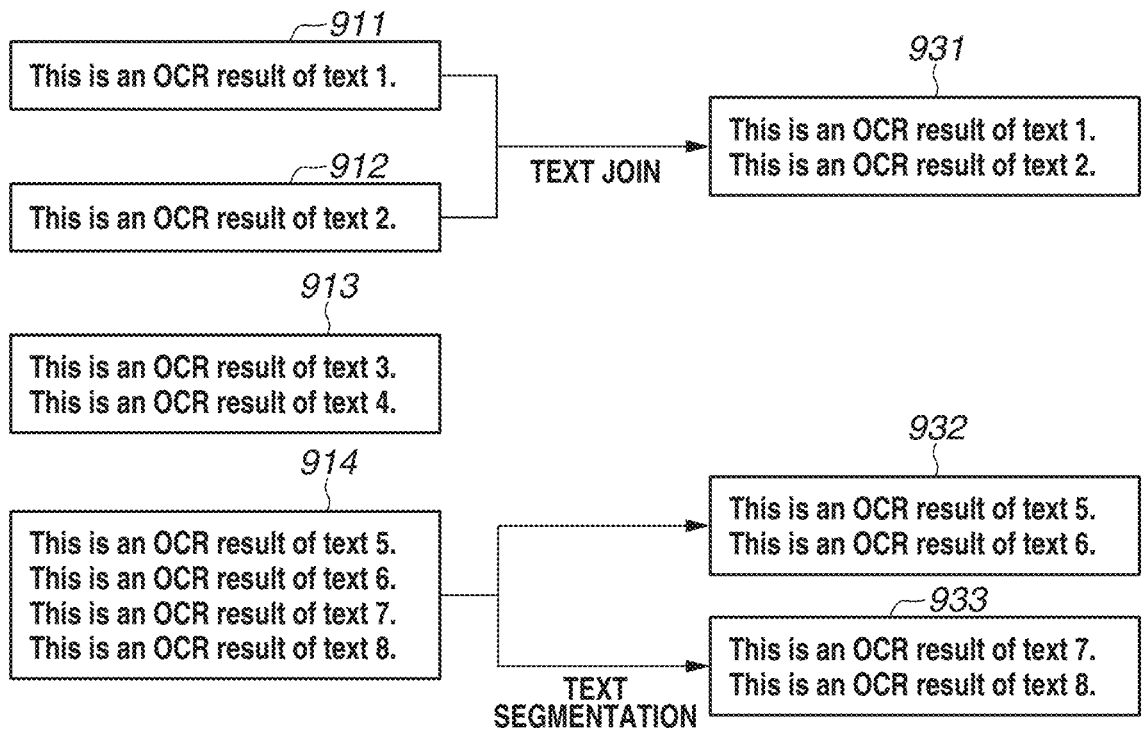
FIG. 9C is a diagram used to explain shaping of OCR results.

An example of shaping of data in step S816 is described with reference to FIG. 9C. FIG. 9C illustrates a result of determination as to whether to perform shaping on the OCR texts 911 to 914 acquired in step S813. Here, an example of shaping in which a unit of input is set as two sentences when characters up to a period is regarded as one sentence is illustrated. Each of the text 911 and text 912 is one sentence as a result of OCR and is, therefore, shorter than the input condition. In such a case, processing for generating a text 931 obtained by joining two texts (911 and 912) is performed. The text 913 satisfies a condition for the unit of input, and, therefore, shaping processing is not performed thereon. The text 914 is four sentences as a result of OCR and is, therefore, longer than the input condition. In such a case, processing for generating a text 932 and a text 933 obtained by segmenting the text 914 based on periods is performed. Furthermore, the method of determining texts targeted for joining can be based on, for example, the orders of acquisition as texts or the positional relationship of extracted character regions and is not limited as long as texts acquired from the same processing target image are targeted.

In step S817, the CPU 261 performs text correction processing. The CPU 261 inputs the OCR text shaped in step S816 to the neural network built out in step S810, thus performing text correction. In the inside of the neural network, estimation is performed in the unit of input used for shaping in step S816, and a corrected text obtained on a sentence-by-sentence basis by integrating estimations is obtained as an output.

In step S818, the CPU 261 determines whether text AI correction processing has been performed on all of the OCR texts acquired in step S813. If it is determined that text AI correction processing has been performed on all of the OCR texts (YES in step S818), the CPU 261 advances the processing to step S819. If not so (NO in step S818), the CPU 261 returns the processing to step S816.

In step S819, the CPU 261 transmits the text obtained in step S817 to the image processing apparatus 101 via the external interface 268.

In step S820, the CPU 261 determines whether to end the processing. If it is determined that the user has performed a predetermined operation such as powering off the OCR server 103 (YES in step S820), the CPU 261 ends the processing. If not so (NO in step S820), the CPU 261 returns the processing to step S811.

Next, an example of conversion caused by text AI correction processing which is performed by the OCR server 103 is described. FIG. 10A is a diagram illustrating a first example of text correction in Japanese. FIG. 10B is a diagram illustrating a second example of text correction in Japanese. FIG. 10C is a diagram illustrating a third example of text correction in Japanese.

An OCR text 1001 illustrated in FIG. 10A contains, in a mixed manner, a text

"重力"

1002, which is a correct text, and a text

"変重力"

1003, which appears as a result of OCR falsely recognizing a text

"変動"

The result obtained by performing text AI correction on the OCR text 1001 is a corrected text 1004. In the corrected text 1004, correction is not performed on the text 1002

("重力"), and the falsely recognized text 1003

("変重力")

is corrected as a text 1005

("変動").

In the correction performed in this example, breakdown is not able to be performed in the case of simply converting a character string based on a dictionary. On the other hand, in the correction using a neural network with a context taken into consideration, a correct correction is attained. In this correcting operation, the entire OCR text 1001 is input to a conversion model as a target for correction and, while taking a context into consideration, the conversion model determines that only the text

"変重力"

1003 is a false recognition and thus performs a conversion from

"重力"

to

"動"

based on a tendency obtained during learning.

An OCR text 1011 illustrated in FIG. 10B contains a text 1012

("映像撮所"), which appears as a result of OCR falsely recognizing a text

"映像撮影".

The result obtained by performing text AI correction on the OCR text 1011 is a corrected text 1013. The corrected text 1013 is an output obtained by converting the text 1012

("映像撮所")

into a correct text 1014

("映像撮影").

The neural network model, which converts a text, has the function of interpreting a context in the input text and replacing a falsely-recognized character string with another character string contained in the same text. In the correction performed in this example, the neural network determines, based on the context, that the text 1012

("映像撮所")

is false, and thus recognizes the text 1012

("映像撮所")

as a target for correction. Then, the neural network draws attention to a text 1015)

("映像撮影")

similarly based on the context and replaces a series of characters

"映像撮所"

with

"映像撮影", thus implementing such a correction. In this way, using a neural network enables implementing a correction which is performed in consideration of a context.

An OCR text 1021 illustrated in FIG. 10C contains a text 1022

("日—ラ"), which appears as a result of OCR falsely recognizing a text

"ロ—ラ"

The result obtained by performing text AI correction on the OCR text 1021 is a corrected text 1023. The corrected text 1023 is an output obtained by converting the text 1022

("日—ラ")

into a correct text 1024

("ロ—ラ").

The neural network, which converts a text, learns, for example, the co-occurrence of words appearing in an input text based on learning data for use as a reference. In the correction performed in this example, the neural network learns a knowledge indicating that, for example, in a case where a word such as a text 1025

("樹脂")

frequently appears in the input text, a word such as

"ロ—ラ"

may frequently appear, and reflects this knowledge in correction contents.

Furthermore, the language to which the present disclosure is directed is not limited to Japanese, and the operation of similarly generating learning data and causing the learning apparatus 102 to learn a neural network model enables also applying text AI correction processing to other languages.

FIG. 11A is a diagram illustrating an example of text correction in English. FIG. 11B is a diagram illustrating an example of text correction in Chinese. Examples of cases where the present disclosure is applied to OCR texts in other than Japanese are described with reference to FIGS. 11A and 11B.

An OCR text 1101 illustrated in FIG. 11A contains a text 1102 ("frrst"), which appears as a result of OCR falsely recognizing "i" in "first" as "r". Moreover, the OCR text 1101 also contains a text 1103 ("particleis20%"), which is output as one word with spaces between words disappearing. The result obtained by performing text AI correction using the learned neural network on the OCR text 1101 is a corrected text 1104. The corrected text 1104 is an output obtained by correctly correcting the text 1102 ("frrst") and the text 1103 ("particleis20%") as a text 1105 ("first") and a text 1106 ("particle is 20%"), respectively. It is considered that the neural network model has drawn attention to a context appearing in the input text and has implemented replacement of characters such as the text 1102 ("frrst") and such a conversion as to correct joining of characters such as the text 1103. Particularly, separating a portion "20%" included in the text 1106 serves as a guide for the model to perform conversion while drawing attention to a similar series of characters such as a portion 1107 ("50%") contained in the same text.

Next, an OCR text 1111 illustrated in FIG. 11B contains a text 1112

("|晢示"), which appears as a result of OCR falsely recognizing a text "指示".

The result obtained by performing text AI correction using the learned neural network on the OCR text 1111 is a corrected text 1113. The corrected text 1113 is an output obtained by correctly correcting the text 1112

("|晢示")

as a text 1114

("指示").

In this case, as with the case of Japanese, the neural network reacts to a context of the input text and a text 1115

("指示")

contained in the input text and thus corrects the text 1112)

("|晢示")

to output the corrected text 1113.

FIGS. 11A and 11B indicate that the present disclosure can be applied to not only Japanese text but also other languages such as English and Chinese.

<Remarks>

As described in the first exemplary embodiment, it is possible to perform learning of a neural network, which converts an OCR text into a correct answer text, and correct an OCR text with use of a result of the learning.

Moreover, while, in the first exemplary embodiment, examples of application to Japanese, English, and Chinese have been described, the intended languages are not limited to these, and similar configurations can also be applied to other languages.

In the above-described first exemplary embodiment, with regard to a method of generating learning data, an example in which the engineer previously performs a process such as printing electronic data has been described. In a second exemplary embodiment described below, an example of improving the accuracy of text correction by making up a learning model customized to a client environment which is actually in operation is described. Specifically, the second exemplary embodiment is directed to a method of generating learning data from PDL data which is used to execute a printing function. The configuration of an image processing system in the second exemplary embodiment is similar to the configuration of the image processing system in the first exemplary embodiment except for characterizing portions. Therefore, similar constituent elements to those of the first exemplary embodiment are assigned the respective same reference numerals as those of the first exemplary embodiment, and the detailed description thereof is omitted here.

<Image Processing System>

FIG. 12 is a diagram illustrating a configuration of an image processing system 1200 according to the second exemplary embodiment. The image processing system 1200 includes an image processing apparatus 101, a learning apparatus 102, an OCR server 103, and a terminal apparatus 1201. The image processing apparatus 101, the learning apparatus 102, the OCR server 103, and the terminal apparatus 1201 are interconnected via a network 104. The image processing apparatus 101, the OCR server 103, and the network 104 are the same as those described above with reference to FIG. 1.

The terminal apparatus 1201 is, for example, a personal computer or a tablet capable of transmitting a print job to the image processing apparatus 101. When the user issues an instruction for printing via an operation unit (not illustrated), the terminal apparatus 1201 transmits a print job (including PDL data) to the image processing apparatus 101. The image processing apparatus 101 not only performs print processing according to the print job transmitted from the terminal apparatus 1201 but also transmits PDL data to the learning apparatus 102. The learning apparatus 102 generates a pair of a correct answer text and an OCR text from the PDL data and stores the generated text pair as learning data.

In the second exemplary embodiment, the learning apparatus 102 includes a learning data generation unit 1210. The learning data generation unit 1210 includes a text matching unit 1212 and an image simulation unit 1211, and generates learning data needed for learning of a neural network. The text matching unit 1212 pairs a correct answer text and an OCR text with each other as a correct pair to generate learning data. The image simulation unit 1211 generates scan-equivalent image data from PDL data by simulation. The learning data generation unit 1210 stores the generated learning data in the storage 235. The learning data generation unit 1210 is implemented by the CPU 231 loading a learning data generation program onto the RAM 234 and executing the learning data generation program.

The learning unit 113 learns a neural network using the learning data stored in the storage 235. The learning unit 113 is implemented by the CPU 231 loading a learning program onto the RAM 234 and executing the learning program.

<Learning Sequence>

A learning sequence is described with reference to FIG. 14. FIG. 14 is a diagram illustrating a learning sequence of the image processing system in the second exemplary embodiment.

First, in step S1401, the user sets setting of whether to perform learning data generation processing, which is described in the present exemplary embodiment, to "ON" via an operation unit of the image processing apparatus 101.

Next, when, in step S1402, the user issues an instruction for printing via the operation unit of the terminal apparatus 1201, then in step S1403, the terminal apparatus 1201 transmits a print job (including PDL data) to the image processing apparatus 101. Upon receiving the print job from the terminal apparatus 1201, in step S1404, the image processing apparatus 101 transmits a learning data generation instruction and PDL data included in the print job to the learning apparatus 102, and, then in step S1411, performs print processing. In step S1405, the learning apparatus 102 generates a correct answer text from the PDL data acquired in step S1404. In step S1406, the learning apparatus 102 performs simulation on the PDL data to generate a processing target image. Then, in step S1407, the learning apparatus 102 transmits the generated processing target image to the OCR server 103. In step S1408, the OCR server 103 performs OCR on the received processing target image to acquire an OCR text, and, in step S1409, transmits the acquired OCR text to the learning apparatus 102. In step S1410, the learning apparatus 102 performs matching processing on the correct answer text and the OCR text acquired in steps S1405 and S1409 to shape the respective texts into a form for use in learning, and then stores the shaped texts in the storage 235. In step S1412, the learning apparatus 102 performs learning based on learning data obtained by text matching and thus updates a learning model. The updated learning model is transmitted to the OCR server 103 at timing when learning has been completed or at timing when a request has been received from the OCR server 103. Furthermore, in parallel with processing performed by the learning apparatus 102, in step S1411, print processing that is based on the print job received in step S1403 is performed by the image processing apparatus 101.

<Operation Screen>

Figure 13:
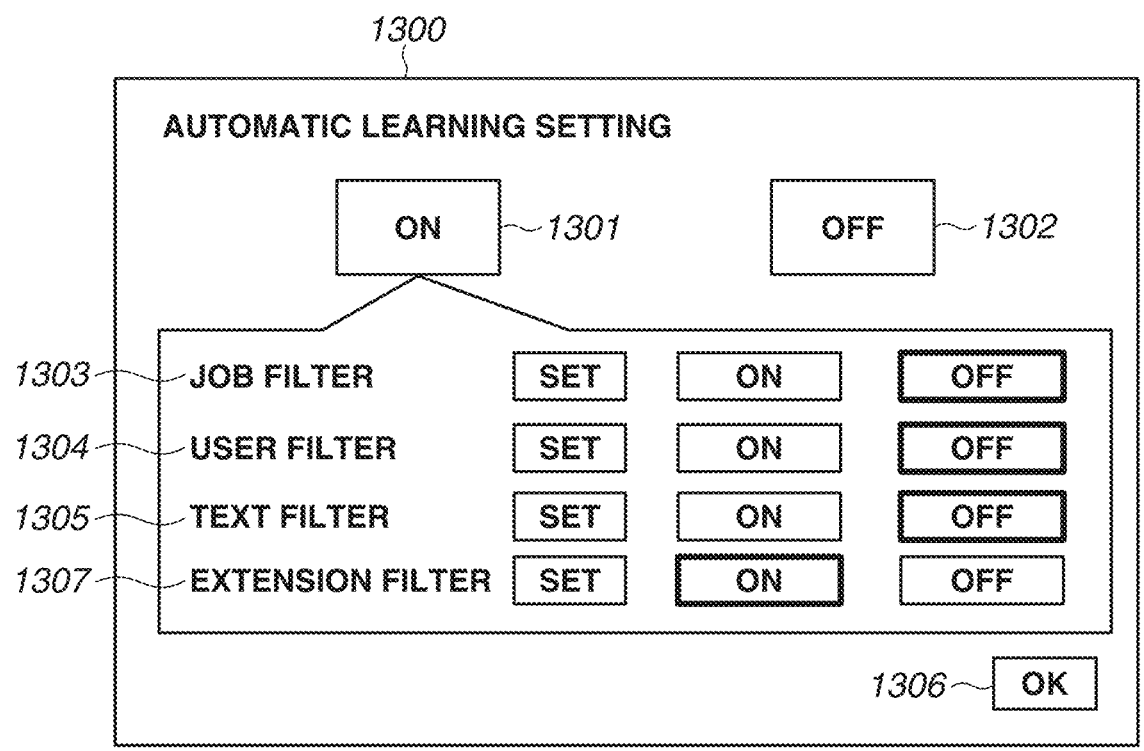
FIG. 13 is a diagram illustrating an automatic learning setting screen.

Setting in step S1401 is performed via a screen illustrated in FIG. 13. FIG. 13 is a diagram illustrating an automatic learning setting screen.

The automatic learning setting screen 1300 includes an ON button 1301, an OFF button 1302, a filter item 1303, a filter item 1304, a filter item 1305, and an OK button 1306.

The ON button 1301 is an instruction button used to perform setting to permit the received print data to be used for automatic learning. The OFF button 1302 is an instruction button used to perform setting not to permit the received print data to be used for automatic learning. The automatic learning setting screen 1300 allows any one of the ON button 1301 and the OFF button 1302 to be set to a selected state.

In the state in which the ON button 1301 is selected, the user is allowed to perform various filter settings based on information included in print data. In other words, in a case where there is a plurality of types of print data, the user is allowed to perform setting to designate one type of print data as an automatic learning target and exclude another type of print data from automatic learning targets. The filter item 1303 allows the user to perform filter setting as to whether to set print data as an automatic learning target based on the attribute of a job. For example, the user is allowed to set whether to learn print data with an ordinary print attribute appended thereto or whether to learn print data with a secure print (password-protected print) attribute appended thereto. Moreover, the user is allowed to set whether to learn print data in which the communication protocol is the Line Printer Daemon Protocol (LPR) or whether to learn print data in which the communication protocol is the Internet Printing Protocol (IPP). Moreover, the user is allowed to set whether to learn print data in which the transmission source address (Internet Protocol (IP) address) is a specific address or whether to learn print data in which the transmission source application information is specific application information.

The filter item 1304 allows the user to perform filter setting as to whether to set print data as an automatic learning target based on the attribute of the user information appended to the print data. For example, the user is allowed to set whether to learn print data to which a user attribute registered in the user list managed by the apparatus (valid user attribute) has been appended or whether to learn print data to which a user attribute not registered in the user list (invalid user attribute) has been appended. Moreover, the user is allowed to set whether to learn print data to which no user attribute is appended (user-unknown data). Moreover, the user is also allowed to designate a user name or group name and set whether to learn print data to which the user name or group name has been appended.

The filter item 1305 allows the user to perform filter setting as to whether to set print data as an automatic learning target based on a text included in the print data. The user is allowed to set, for example, whether to learn print data including a specific word in the title name or whether to learn print data including a specific word in the main text. Furthermore, a combination of a plurality of words can be used to designate a filter method.

The filter item 1307 allows the user to perform filter setting as to whether to set print data as an automatic learning target based on information about the filename extension of electronic data from which the print data has been generated. This extension information is acquired from job information appended to print data. Alternatively, the extension information is acquired by extraction from a part of the title name of print data. Examples of the extension information include extensions regarding images, such as "jpg", "png", "bmp", "tif", and "gif", and extensions regarding documents, such as "txt", "doc", "docx", "ppt", "pptx", "xls", "xlsx", "htm", "html", "xps", and "pdf". Print data to which the extension "jpg", "png", "bmp", or "tif" regarding images among the above-mentioned extensions is appended has a high likelihood of not allowing character information (correct answer text) to be acquired therefrom. Therefore, it is desirable to exclude learning data with such an extension appended thereto from learning targets.

Moreover, with regard to "pdf" out of the extensions regarding documents, during the process of data being passed from a document management application to a printer driver, character information is often replaced by vector information. Characters which have become vector information are difficult to extract as text information. Therefore, print data including "pdf" can be excluded from learning targets. Furthermore, there is a case where the image processing apparatus 101 directly acquires a PDF file (data of the PDF format) without via a printer driver and prints the PDF file (direct printing). Examples of the direct printing include network direct printing, which is performed via a network, and media direct printing, which is performed via a storage medium such as a Universal Serial Bus (USB) memory.

In this case, even if the extension is "pdf", character information (correct answer text) is likely to be included in print data. Accordingly, for a more efficient operation, rather than simply excluding the extension "pdf" from learning targets, it is desirable to set a filter in a different method. For example, in the filter item 1303, performing setting to exclude data in which "Acrobat®" is included in the transmission source application from learning targets enables excluding print data in which character information has been replaced by vector information from learning targets. The above-mentioned filter setting can be not a setting which the user is allowed to optionally perform but a setting which is applied as a principle filter setting. In the following description, a case of using only a filter that is based on extensions and not using the other filters is described.

<Learning Data Generation Request Processing>

Next, learning data generation request processing which is performed by the image processing apparatus 101 in the second exemplary embodiment is described. The image processing apparatus 101 transmits PDL data to the learning apparatus 102 and requests the learning apparatus 102 to perform learning data generation processing.

Figure 15A:
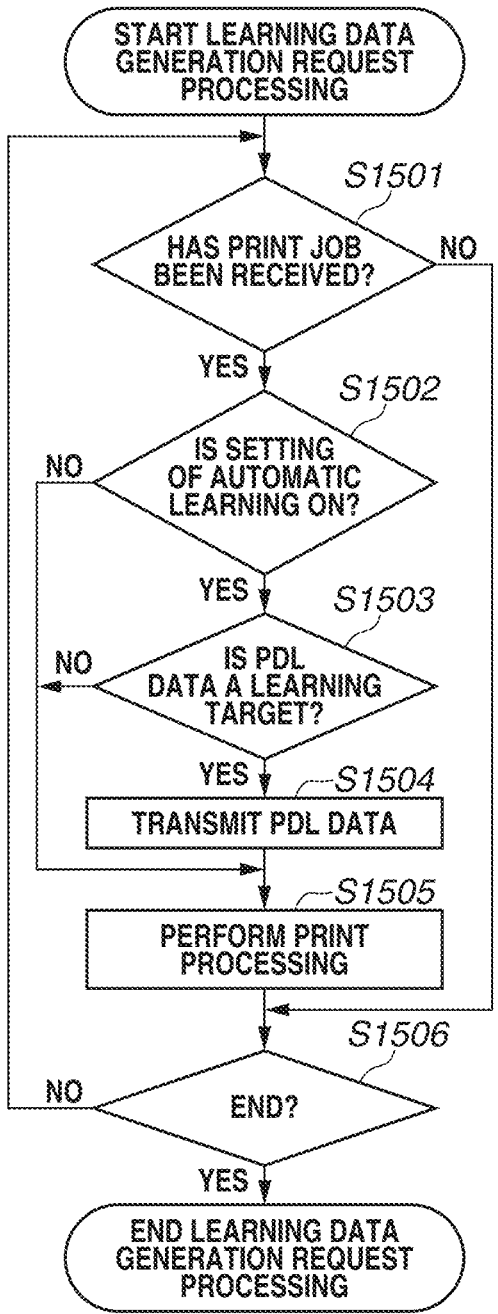
FIG. 15A is a flowchart illustrating a flow of learning data generation request processing.
Figure 15B:
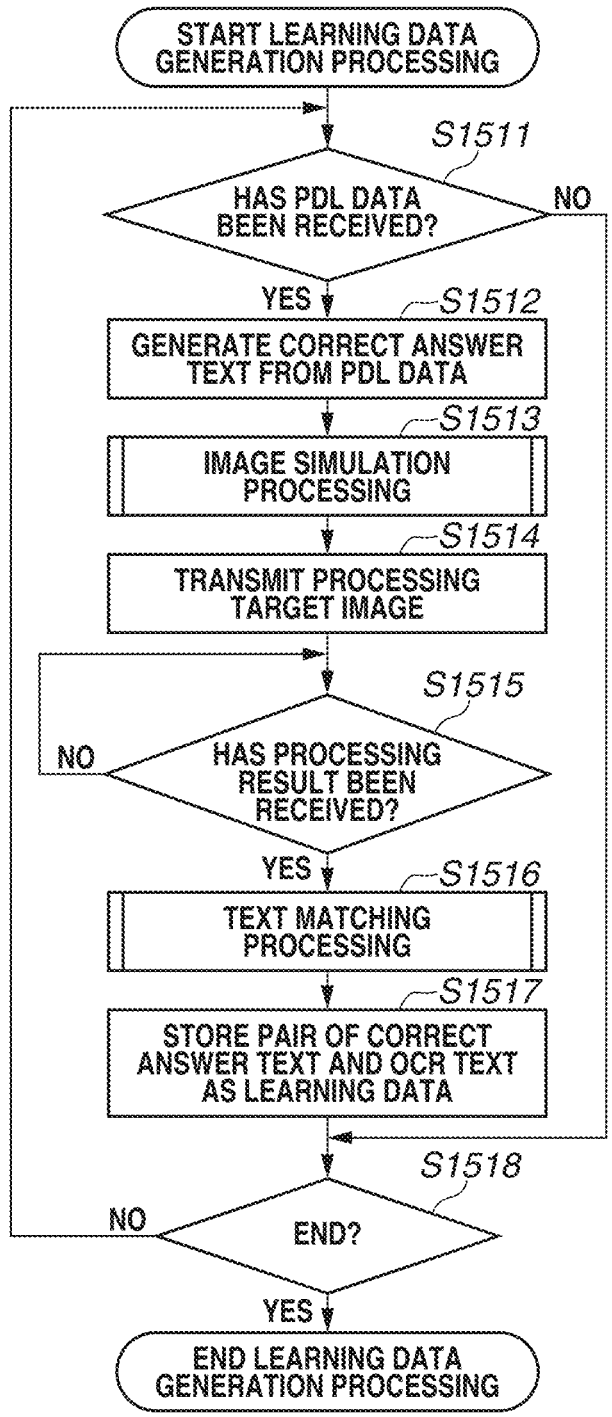
FIG. 15B is a flowchart illustrating a flow of learning data generation processing.

FIG. 15B is a flowchart illustrating the learning data generation processing. FIG. 15A is a flowchart illustrating the learning data generation request processing. The learning data generation request processing is implemented by the CPU 201 of the image processing apparatus 101 reading out a control program stored in the storage 208, loading the control program onto the RAM 204, and executing the control program. The learning data generation request processing is started in response to the image processing apparatus 101 receiving a print job from the terminal apparatus 1201.

First, in step S1501, the CPU 201 determines whether a print job has been received from the terminal apparatus 1201. If it is determined that a print job has been received (YES in step S1501), the CPU 201 advances the processing to step S1502. If not so (NO in step S1501), the CPU 201 advances the processing to step S1506.

In step S1502, the CPU 201 determines whether automatic learning is ON in the setting of the image processing apparatus 101. If it is determined that automatic learning is ON (YES in step S1502), the CPU 201 advances the processing to step S1503. If not so (NO in step S1502), the CPU 201 advances the processing to step S1505.

In step S1503, the CPU 201 determines whether PDL data is consistent with a condition for learning targets. Specifically, the CPU 201 determines whether PDL data is a learning target according to the items described with reference to FIG. 13. For example, in the case of PDL data to which, for example, the extension regarding images, such as "jpg", "png", "bmp", "tif", or "gif", has been appended as the extension of a file from which the PDL data has been generated, since the PDL data is unlikely to include a correct answer text, it is determined that the PDL data is not a learning target (NO in step S1503), and, then, the CPU 201 advances the processing to step S1505. In the case of PDL data to which an extension other than the extensions regarding images has been appended, the PDL data is likely to include a correct answer text. Therefore, it is determined that the PDL data is a learning target (YES in step S1503), and, then, the CPU 201 advances the processing to step S1504. Examples of the extension other than the extensions regarding images include "txt", "doc", "docx", "ppt", "pptx", "xls", "xlsx", "htm", "html", "xps", and "pdf".

Furthermore, instead of performing discrimination using extensions, the operation of analyzing PDL data to check a character attribute object and performing determination based on a result of the checking can be employed. Thus, if an analysis result including a character attribute object is obtained (YES in step S1503), the CPU 201 advances the processing to step S1504, and, if an analysis result including no character attribute object is obtained (NO in step S1503), the CPU 201 advances the processing to step S1505.

In step S1504, the CPU 201 transmits the PDL data to the learning apparatus 102 via the external interface 211 and thus requests the learning apparatus 102 to perform learning data generation processing.

In step S1505, the CPU 201 performs print processing. Since the print processing is general processing which is performed by an image processing apparatus such as an MFP, the detailed description thereof is omitted.

In step S1506, the CPU 201 determines whether to end the learning data generation request processing. If it is determined that the user has performed a predetermined operation such as powering off the image processing apparatus 101 (YES in step S1506), the CPU 201 ends the processing. If not so (NO in step S1506), the CPU 201 returns the processing to step S1501.

<Learning Data Generation Processing>

Next, learning data generation processing which is performed by the learning apparatus 102 in the second exemplary embodiment is described. FIG. 15B is a flowchart illustrating the learning data generation processing. The learning apparatus 102 performs learning data generation processing for generating learning data (a pair of a correct answer text and an OCR text) from PDL data received from the image processing apparatus 101. The learning data generation processing is implemented by the CPU 231 reading out a learning data generation program stored in the storage 235, loads the learning data generation program onto the RAM 234, and executing the learning data generation program.

In step S1511, the CPU 231 determines whether PDL data has been received from the image processing apparatus 101. If it is determined that PDL has been received via the external interface 238 (YES in step S1511), the CPU 231 advances the processing to step S1512. If not so (NO in step S1511), the CPU 231 advances the processing to step S1518.

In step S1512, the CPU 231 generates a correct answer text from the received PDL data. In other words, the CPU 231 interprets the PDL data and acquires, as a correct answer text, a character attribute object included in the PDL data. The method of interpreting PDL data can be implemented by application of a known technique such as an interpreter which is used in, for example, an MFP.

In step S1513, the CPU 231 performs simulation with the image simulation unit 1211 to generate a processing target image from the PDL data. As mentioned above, since an output result of OCR is affected by a deterioration cause such as noise in an image, a raster image generated from PDL data and an image obtained by actually scanning an original become different in the obtained OCR text. Therefore, if a raster image generated from PDL data is directly used as learning data, the accuracy of text AI correction may be low.

Therefore, the second exemplary embodiment generates, by simulation, a processing target image including a deterioration cause which may occur in the case of scanning an original. Accordingly, performing OCR processing on the thus-obtained image enables acquiring an OCR text close to a result obtained by actually scanning an original.

Details of the image simulation processing are described below and are, therefore, omitted from description here.

In step S1514, the CPU 231 transmits the processing target image generated in step S1513 to the OCR server 103 and requests the OCR server 103 to perform OCR processing on the processing target image. At this time, imparting information for setting the setting value of text AI correction processing OFF enables obtaining text information which is not subjected to text AI correction. Furthermore, as long as text information which is not subjected to text AI correction is able to be obtained, for example, flag information indicating a request for OCR for learning can be provided separately.

In step S1515, the CPU 231 determines whether a processing result has been received from the OCR server 103. If it is determined that a processing result has been received from the OCR server 103 via the external interface 238 (YES in step S1515), the CPU 231 advances the processing to step S1516. If not so (NO in step S1515), the CPU 231 repeats processing in step S1515.

In step S1516, the CPU 231 performs generation of learning data with use of the correct answer text acquired in step S1512 and the OCR text acquired in step S1515. The generation of learning data as used herein means generating a pair of a correct answer text and an OCR text, and is implemented by text matching processing. Details of the text matching processing are described below, and are, therefore, omitted from description here.

In step S1517, the CPU 231 stores, as learning data, the pair of a correct answer text and an OCR text acquired by the text matching processing in step S1516 in the storage 235.

In step S1518, the CPU 231 determines whether to end the learning data generation processing. If it is determined that the user has performed a predetermined operation such as powering off the learning apparatus 102 (YES in step S1518), the CPU 231 ends the processing. If not so (NO in step S1518), the CPU 231 returns the processing to step S1511.

<Image Simulation Processing>

Figure 16:
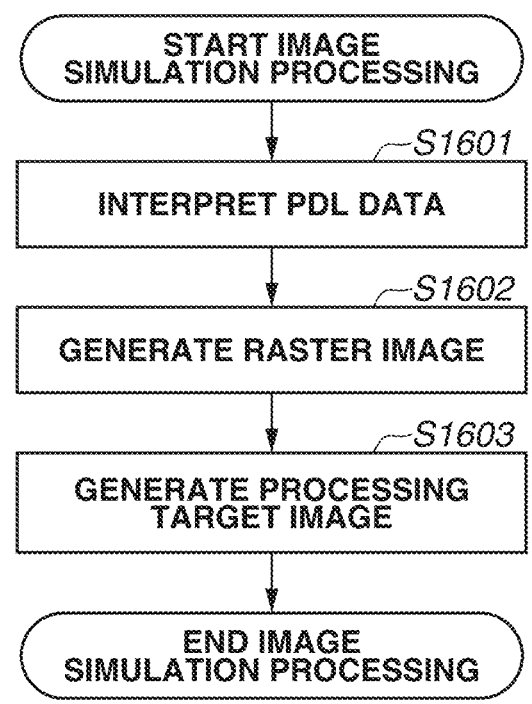
FIG. 16 is a flowchart illustrating a flow of image simulation processing.

Next, image simulation processing which is performed by the image simulation unit 1211 of the learning apparatus 102 is described with reference to FIG. 16. The image simulation processing is implemented by the CPU 231 reading out an image simulation program stored in the storage 235, loads the image simulation program onto the RAM 234, and executing the image simulation program. FIG. 16 is a flowchart illustrating the image simulation processing.

First, in step S1601, the CPU 231 interprets PDL data received from the image processing apparatus 101. The PDL data includes data indicating a document structure targeted for printing, and the CPU 231 acquires information needed to generate an image from the PDL data.

In step S1602, the CPU 231 generates a raster image such as a bit-mapped image based on the document information acquired in step S1601. This processing is implemented by a known module called a "raster image processor (RIP)". The processing which is performed in steps S1601 and S1602 is processing which is internally performed when an image processing apparatus performs print processing and is a known technique, and the detailed description thereof is, therefore, omitted.

Next, in step S1603, the CPU 231 performs simulation of a processing target image based on the raster image generated in step S1602. The simulation as used herein means imparting, to the raster image, a deterioration cause which occurs on an image during scanning. In the second exemplary embodiment, examples of elements of the deterioration cause include "image blurring", "noise addition", and "image skew". These elements of the deterioration cause can be implemented by known image processing techniques. For example, "image blurring" can be implemented by down sampling for thinning out pixels of an image, and "image skew" can be implemented by rotation transform of an image. While, in this case, the degree of each processing needs to be set by parameters, a configuration in which, for example, the range within which each parameter can fall is previously set and each parameter is randomly set within the range for every image simulation is employed. With regard to the range within which each parameter can fall, for example, the similarity between an actually scanned image and images generated with parameters being varied is previously evaluated, and a parameter for achieving the highest similarity can be employed.

Furthermore, while, in the second exemplary embodiment, a combination of known image processing techniques is employed as a simulation method, the simulation method for a processing target image is not limited to this. For example, a neural network which performs image conversion with a pair of a raster image and an actually scanned image set as learning data can be learned, and a processing target image can be generated by application of the learned neural network.

Moreover, the deterioration cause to be included during simulation is not limited to the above-mentioned elements ("image blurring", "noise addition", and "image skew"), and processing for implementing another element can be performed.

<Text Matching Processing>

Next, text matching processing which is performed in step S1516 when the learning apparatus 102 generates learning data is described with reference to FIG. 17. FIG. 17 is a diagram illustrating an example of text matching.

FIG. 17 illustrates, as an example, a correct answer text 1701 obtained in step S1512, in which three texts 1702 to 1704 are included, and an OCR text 1705, which corresponds to the correct answer text 1701. In the second exemplary embodiment, performing setting in which inputting to a neural network is a unit of one sentence delimited with a period in Japanese and generating learning data from the correct answer text 1701 and the OCR text 1705 are considered.

In the case of intending to perform segmentation in units of a period in Japanese, for the purpose of simple processing, each of the correct answer text 1701 and the OCR text 1705 can be segmented in units of a period in Japanese and matching can be performed on the respective sentences in sequence. However, since a text generated by OCR contains some false recognitions, in a case where a period in Japanese is falsely recognized, correct matching may not be performed. Referring to FIG. 17, since a period in Japanese ("。") present in the text 1703 has been replaced by a bullet ("•") 1707 in the OCR text 1705, if segmentation is performed in units of a period in Japanese, a text 1708 in which two sentences are present in a mixed manner appears. If matching is performed in this state, erroneous matching such as between the text 1702 and the text 1706 and between the text 1703 and the text 1708 is performed, so that correct learning data cannot be obtained.

Therefore, when generating learning data, the second exemplary embodiment performs text matching processing with the text matching unit 1212 of the learning apparatus 102, thus acquiring an appropriate text pair.

Figure 18:
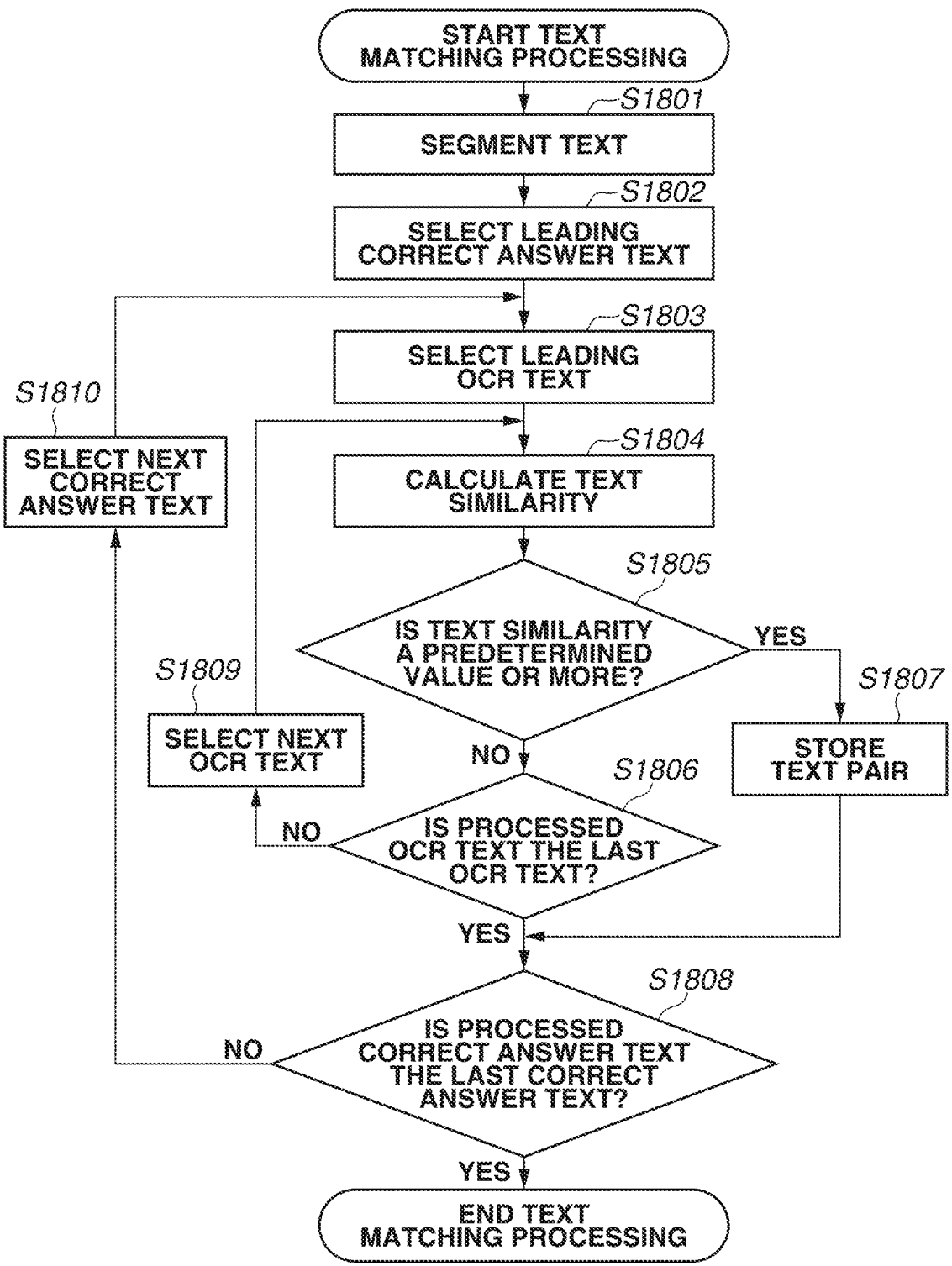
FIG. 18 is a flowchart illustrating a flow of text matching processing.

The flow of text matching processing which is performed by the learning apparatus 102 in the second exemplary embodiment is described. FIG. 18 is a flowchart illustrating the text matching processing. The learning apparatus 102 performs the text matching processing on a correct answer text and an OCR text, thus generating correct answer data. The text matching processing is implemented by the CPU 231 reading out a text matching processing program stored in the storage 235, loading the text matching processing program onto the RAM 234, and executing the text matching processing program.

In step S1801, the CPU 231 performs text segmentation. Since, in the second exemplary embodiment, inputting to a neural network is set to a unit of one sentence, the CPU 231 performs processing for acquiring texts obtained by segmenting each of the correct answer text and the OCR text in units of a period in Japanese. Texts obtained by segmentation in step S1801 can be sorted in sequence based on, for example, coordinate information.

In step S1802, the CPU 231 acquires a leading correct answer text out of the correct answer texts. In step S1803, the CPU 231 acquires a leading OCR text out of the OCR texts.

In step S1804, the CPU 231 calculates a text similarity between the two acquired texts. The text similarity as used herein is a measure used to evaluate how much the two texts are similar to each other, and can be calculated by using, for example, a known technique such as Levenshtein distance.

In step S1805, the CPU 231 determines whether the text similarity calculated in step S1804 is a predetermined value or more. If it is determined that the text similarity is the predetermined value or more (YES in step S1805), the CPU 231 advances the processing to step S1807. If not so (NO in step S1805), the CPU 231 advances the processing to step S1806.

In step S1807, the CPU 231 stores a text pair of the correct answer text and the OCR text, the text similarity of which has been determined to be the predetermined value or more, in the storage 235. After storing the text pair, the CPU 231 advances the processing to step S1808.

In step S1806, the CPU 231 determines whether the OCR text used for processing in step S1805 is the last OCR text out of the OCR texts obtained by segmentation. If it is determined that the OCR text used for processing is the last OCR text (YES in step S1806), the CPU 231 advances the processing to step S1808. If not so (NO in step S1806), the CPU 231 advances the processing to step S1809.

In step S1809, the CPU 231 acquires an OCR text next to the OCR text used for processing in step S1805, and then returns the processing to step S1804. Advancing the steps in this way enables comparing the currently acquired correct answer text with every OCR text in a round-robin manner.

In step S1808, the CPU 231 determines whether the correct answer text used for processing in step S1805 is the last correct answer text out of the correct answer texts obtained by segmentation. If it is determined that the correct answer text used for processing is the last correct answer text (YES in step S1808), the CPU 231 ends the text matching processing. If not so (NO in step S1808), the CPU 231 advances the processing to step S1810.

In step S1810, the CPU 231 acquires a correct answer text next to the correct answer text used for processing in step S1805, and then returns the processing to step S1803. Advancing the steps in this way enables performing a text similarity comparison with each OCR text with respect to every correct answer text obtained by segmentation.

<Remarks>

The method of generating learning data in the image processing system 1200 has been described above. When the printing function of the image processing apparatus 101 is used, the image processing system 1200 acquires a correct answer text from PDL data. Moreover, the image processing system 1200 acquires a scan-equivalent processing target image from PDL data by simulation and then acquires an OCR text by performing OCR on the processing target image. The learning apparatus 102 pairs these texts by text matching processing, thus generating learning data. This enables collecting learning data needed for learning of a neural network without troublesome work.

Moreover, the second exemplary embodiment allows the user to set whether to use PDL data, which is used for a printing function, for learning of a neural network. Therefore, the second exemplary embodiment is able to meet the demands of both a user who intends to maintain the accuracy of text AI correction and a user who intends to improve the accuracy of text AI correction. Moreover, the second exemplary embodiment allows the user to customize in detail which PDL data to set as a learning target out of pieces of PDL data used for a printing function. Therefore, the second exemplary embodiment is able to perform higher-accuracy learning. Moreover, excluding data unsuitable for learning from learning targets enables reducing a series of processing costs and communication costs needed during a period from the time of acquiring PDL data to the time of performing learning.

Furthermore, while, in the second exemplary embodiment, the method of associating texts with each other by performing a similarity evaluation between the texts has been described, another method can be employed with respect to the association between texts as long as such a method does not depart from the scope of the present disclosure. For example, a configuration in which a pair of an OCR text and a correct answer text is set as learning data, a neural network which estimates a delimiting position of a text is learned, and the text matching unit 1212 executes the neural network can be employed.

In the above-described second exemplary embodiment, with regard to the method of generating learning data, automatic learning setting of print data is provided as a setting item for the image processing apparatus. In a third exemplary embodiment, a case where, when issuing an instruction for printing via a terminal apparatus, the user designates whether to cause learning to be performed is described.

Furthermore, the configuration of an image processing system in the third exemplary embodiment is similar to the configuration of the image processing system in the second exemplary embodiment except for characterizing portions. Therefore, similar constituent elements to those of the second exemplary embodiment are assigned the respective same reference numerals as those of the second exemplary embodiment, and the detailed description thereof is omitted here.

<Learning Sequence>

A learning sequence is described with reference to FIG. 19A. FIG. 19A is a diagram illustrating a learning sequence of the image processing system in the third exemplary embodiment.

First, in step S1901, the user performs, via an operation unit (a display device or an input device), an operation of launching a printer driver in the terminal apparatus 1201 and designating a print job scheduled for transmission as learning data. Furthermore, the terminal apparatus 1201 is assumed to have a configuration similar to that of the OCR server 103 illustrated in FIG. 2C.

Next, when, in step S1902, the user issues an instruction for printing via the operation unit of the terminal apparatus 1201, then in step S1903, the terminal apparatus 1201 transmits a print job (including PDL data) to the image processing apparatus 101. Furthermore, as the print job has a learning data flag appended thereto, in step S1904, the image processing apparatus 101, which has detected the learning data flag, transmits the received PDL data to the learning apparatus 102. Processing operations in subsequent steps S1405 to S1412 are the same as those described above, and are, therefore, omitted from description here.

<Operation Screen>

A printer driver screen which the user operates in steps S1901 and S1902 is described. FIG. 19B is a diagram illustrating the printer driver screen.

The printer driver screen 1950 is a screen which is displayed when a printing function is invoked from, for example, a document editing application.

The printer driver screen 1950 includes a check field 1951, a cancel button 1952, and a print button 1953.

The check field 1951 is a field used to designate whether to use PDL data, which is to be transmitted as a print job to the image processing apparatus 101, for learning for text AI correction. In response to the checkbox of the check field 1951 being checked, the PDL data becomes targeted for learning, and, in response to the checkbox of the check field 1951 being unchecked, the PDL data becomes untargeted for learning.

The cancel button 1952 is a button used to cease the use of the printing function. In response to the cancel button 1952 being selected, the printer driver screen 1950 is closed.

The print button 1953 is a button used to start processing for transmitting a print job to the image processing apparatus 101. In response to the checkbox of the check field 1951 being checked and the print button 1953 being selected, the transmission of a print job with a learning data flag appended thereto is started.

<Remarks>

In the above description, an exemplary embodiment different from the second exemplary embodiment in the method of designating data from which learning data is generated in the image processing system 1200 has been described. This has provided an example in which the designation of a learning object is performed in a job setting performed on the side of the terminal apparatus 1201. In the third exemplary embodiment, since the user is allowed to designate a learning target for every job via the printer driver, learning can be performed according to the request of the user.

In the above-described second exemplary embodiment, with regard to the method of generating learning data, automatic learning setting of print data is provided as a setting item for the image processing apparatus. In a fourth exemplary embodiment, a case where, with respect to pieces of PDL data accumulated in the image processing apparatus, the user designates whether to cause learning to be performed is described. Furthermore, the configuration of an image processing system in the fourth exemplary embodiment is similar to the configuration of the image processing system in the second exemplary embodiment except for characterizing portions. Therefore, similar constituent elements to those of the second exemplary embodiment are assigned the respective same reference numerals as those of the second exemplary embodiment, and the detailed description thereof is omitted here.

<Learning Sequence>

A learning sequence is described with reference to FIG. 20A. FIG. 20A is a diagram illustrating a learning sequence of the image processing system in the fourth exemplary embodiment. When, in step S2001, the user issues an instruction for printing via an operation unit of the terminal apparatus 1201, then in step S2002, the terminal apparatus 1201 transmits a print job (including PDL data) to the image processing apparatus 101. Upon receiving the print job from the terminal apparatus 1201, in step S2003, the image processing apparatus 101 stores PDL data included in the print job in the storage 208 and manages the PDL data in a list manner using bibliographic information. Furthermore, this storage processing can be performed based on secure printing setting (storage processing setting) set in the image processing apparatus 101, or can be performed based on a secure printing flag (storage processing flag) included in the print job.

Print jobs stored in the above-mentioned way are displayed in a print job selection screen (designation screen) in a selectable manner. Then, when, in step S2004, the user selects a print job from the print job selection screen and designates the print job as a learning job, then in step S2005, the image processing apparatus 101 transmits the stored PDL data to the learning apparatus 102. Processing operations in subsequent steps S1405 to S1412 are the same as those described above, and are, therefore, omitted from description here. Furthermore, in the fourth exemplary embodiment, print processing in step S1411 is not performed.

<Operation Screen>

A print job selection screen which becomes able to be displayed in the operation screen of the image processing apparatus 101 after step S2004 is described. FIG. 20B is a diagram illustrating the print job selection screen.

The print job selection screen 2050 includes a job list 2051, a setting button 2052, a display button 2053, a deletion button 2054, a learning server transfer button 2055, and a print start button 2056.

The job list 2051 is a list of jobs which are stored in the storage 208 and for which an instruction for printing is able to be issued. Here, only jobs which are associated with the user A who is logged in to the image processing apparatus 101 are displayed. The job list 2051 allows the user to designate at least one job from among a plurality of jobs and bring the designated job into a selected state.

The setting button 2052 is a button used to invoke a screen for changing the print setting with respect to a job currently selected in the job list 2051. The display button 2053 is a button used to invoke a preview screen for a job currently selected in the job list 2051. The deletion button 2054 is a button used to delete, from the job list 2051, a job currently selected in the job list 2051. The learning server transfer button 2055 is a button used to transmit, to the learning apparatus 102, a job currently selected in the job list 2051. The print start button 2056 is a button used to start printing that is based on a job currently selected in the job list 2051.

<Remarks>

In the above description, an exemplary embodiment different from the second and third exemplary embodiments in the method of designating data from which learning data is generated in the image processing system 1200 has been described. This has provided an example in which print data previously received by the image processing apparatus 101 is designated as a learning target. In the fourth exemplary embodiment, since the user is allowed to designate a learning target for every job via the operation unit of the image processing apparatus 101, learning can be performed according to the request of the user.

Furthermore, in the fourth exemplary embodiment, a case where one job is selected in the print job selection screen and is transmitted to the learning apparatus 102 has been described. However, a configuration in which a plurality of pieces of data is designated in the print job selection screen and is collectively transmitted to the learning apparatus 102 can be employed.

The present disclosure is not limited to the above-described exemplary embodiments but can be modified in various manners (including an organic combination of some or all of the above-described exemplary embodiments) based on the gist of the present disclosure, and such modifications are not excluded from the scope of the present disclosure. In other words, all of the combinations of some or all of the above-described exemplary embodiments and modification examples thereof are also included in the present disclosure.

In step S1602 in the second exemplary embodiment, a raster image is generated without making an alteration to PDL data. However, a raster image can be generated after making an alteration to PDL data. For example, if the OCR unit 114 is able to perform OCR processing while effectively removing image elements other than characters (for example, a background image), object information other than character attribute objects can be deleted before the generation of a raster image in step S1602. Then, a raster image including only character attribute objects can be generated.

In the first to fourth exemplary embodiments, the learning apparatus 102 passively performs learning processing in response to data being input. However, the learning apparatus 102 can actively acquire learning data or data from which learning data is generated. For example, the learning apparatus 102 can be configured to generate PDL data from document data acquired by accessing a document management server (not illustrated) and then generate learning data based on the PDL data as in the above-described exemplary embodiments.

Moreover, the learning apparatus 102 can start learning processing by being triggered by another condition. For example, a configuration in which, each time the learning data generation processing is performed and a predetermined number of pieces of learning data are stored in the storage 235, the learning apparatus 102 performs learning processing can be employed.

The present disclosure can also be implemented by processing for supplying a program for implementing one or more functions of the above-described exemplary embodiments to a system or apparatus via a network or a storage medium and causing one or more processors in a computer of the system or apparatus to read out and execute the program. Moreover, the present disclosure can also be implemented by a circuit which implements the one or more functions (for example, an application specific integrated circuit (ASIC)).

The present disclosure can be applied to a system composed of a plurality of devices or can be applied to an apparatus composed of a single device. For example, in the second exemplary embodiment, the learning data generation unit 1210 and the learning unit 113 are configured to be implemented in the learning apparatus 102, but can be configured to be implemented in the respective separate apparatuses. In this case, the apparatus in which the learning data generation unit 1210 is implemented transmits learning data generated by the learning data generation unit 1210 to the apparatus in which the learning unit 113 is implemented. Then, the learning unit 113 learns a neural network based on the received learning data. Moreover, while an example in which the image processing apparatus 101 and the OCR server 103 are respective separate apparatuses has been described, the image processing apparatus 101 can be configured to be equipped with the functions of the OCR server 103.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-241723 filed Dec. 25, 2018, which is hereby incorporated by reference herein in its entirety.

What is claimed is:

1. An image processing system comprising:
a unit configured to acquire a learning neural network model which has been trained based on learning data in which first text information included in print data and second text information acquired by performing optical character recognition (OCR) processing on an image that is based on the print data are associated with each other;
a unit configured to acquire an image obtained by a scanner;
a unit configured to acquire third text information which is generated by performing OCR processing on the image obtained by the scanner; and
a unit configured to output fourth text information according to inputting of the third text information based on the neural network model.

2. The image processing system according to claim 1, further comprising a unit configured to cause the neural network model to perform learning based on the learning data.

3. The image processing system according to claim 1, further comprising a unit configured to generate the learning data based on the first text information and the second text information.

4. The image processing system according to claim 1, further comprising a unit configured to generate the first text information and the second text information based on the print data.

5. The image processing system according to claim 1, wherein a plurality of pieces of learning data is generated based on information obtained from one page out of the print data.

6. The image processing system according to claim 1, wherein the first text information and the second text information are a combination in which a relationship between the first text information and the second text information satisfies a predetermined condition.

7. The image processing system according to claim 6, wherein the predetermined condition is a similarity calculated by a predetermined method being a predetermined value or more.

8. The image processing system according to claim 1, wherein the print data is page-description language (PDL) format data.

9. The image processing system according to claim 1, further comprising a unit configured to transmit at least data that is based on the fourth text information to a predetermined destination.

10. The image processing system according to claim 9, wherein the predetermined destination is a destination designated by an e-mail address.

11. The image processing system according to claim 9, wherein the predetermined destination is a storage region which is allocated in a local storage.

12. The image processing system according to claim 9, wherein the predetermined destination is a cloud server.

13. The image processing system according to claim 9, wherein the predetermined destination is a shared folder which another apparatus network-connected to the image processing system provides.

14. The image processing system according to claim 9, wherein the data that is based on the fourth text information is page-description language (PDL) format data.

15. The image processing system according to claim 14, wherein the data of PDL format includes searchable character information.

16. The image processing system according to claim 1, further comprising a determination unit configured to make a determination as to whether to use print data received from an external apparatus for generation of learning data.

17. The image processing system according to claim 16, further comprising a unit configured to cause a display device to display a setting screen via which setting concerning the determination unit is able to be performed.

18. The image processing system according to claim 16, further comprising a unit configured to cause a display device to display a designation screen via which print data targeted for the determination is able to be designated from among pieces of print data received from the external apparatus and stored in a manner in which an instruction for printing is able to be issued thereon.

19. The image processing system according to claim 1, further comprising a unit configured to determine that first print data received from an external apparatus is print data which is not used for generation of learning data and determine that second print data received from the external apparatus is print data which is used for generation of learning data.

20. The image processing system according to claim 19, wherein the first print data is data that is based on a Portable Document Format (PDF) file and the second print data is data that is based on a file different from PDF files.

21. The image processing system according to claim 19, wherein one of the first print data and the second print data is print data an extension of a source file of which is a predetermined extension, and the other of the first print data and the second print data is print data an extension of a source file of which is different from the predetermined extension.

22. The image processing system according to claim 19, wherein one of the first print data and the second print data is print data with predetermined user information appended thereto, and the other of the first print data and the second print data is print data with the predetermined user information not appended thereto.

23. The image processing system according to claim 19, wherein one of the first print data and the second print data is print data a transmission source of which is a predetermined address, and the other of the first print data and the second print data is print data a transmission source of which is an address different from the predetermined address.

24. The image processing system according to claim 19, wherein one of the first print data and the second print data is print data with predetermined application information appended thereto, and the other of the first print data and the second print data is print data with the predetermined application information not appended thereto.

25. The image processing system according to claim 19, wherein one of the first print data and the second print data is print data transmitted from the external apparatus in a predetermined protocol, and the other of the first print data and the second print data is print data transmitted from the external apparatus in a protocol different from the predetermined protocol.

26. The image processing system according to claim 19, wherein one of the first print data and the second print data is print data in which predetermined text information is included, and the other of the first print data and the second print data is print data in which the predetermined text information is not included.

27. The image processing system according to claim 19, wherein one of the first print data and the second print data is print data with predetermined flag information appended thereto, and the other of the first print data and the second print data is print data with the predetermined flag information not appended thereto.

28. An image processing method comprising:

acquiring a neural network model which has performed learning based on learning data in which first text information included in print data and second text information acquired by performing optical character recognition (OCR) processing on an image that is based on the print data are associated with each other;

acquiring an image obtained by a scanner;

acquiring third text information which is generated by performing OCR processing on the image obtained by the scanner; and outputting fourth text information according to inputting of the third text information based on the acquired neural network model.

* * * * *